US008625167B2

(12) United States Patent
Amagai

(10) Patent No.: US 8,625,167 B2
(45) Date of Patent: *Jan. 7, 2014

(54) IMAGE PROCESSING, READING OR FORMING APPARATUS AND METHOD FOR ADDING SPECIFIC IMAGE DATA TO OBTAINED IMAGE DATA WHILE ENCRYPTING DETAILS DATA SPECIFYING SPECIFIC DATA AND ADDING ENCRYPTED DETAILS DATA TO OBTAINED IMAGE DATA, AND NON-TRANSITORY RECORDING MEDIUM RECORDING PROGRAM FOR CAUSING COMPUTER TO FUNCTION AS THE SAME

(75) Inventor: Takayuki Amagai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 674 days.

This patent is subject to a terminal disclaimer.

(21) Appl. No.: 12/803,238

(22) Filed: Jun. 22, 2010

(65) Prior Publication Data

US 2010/0321739 A1 Dec. 23, 2010

(30) Foreign Application Priority Data

Jun. 22, 2009 (JP) ................................. 2009-148028

(51) Int. Cl.
*G06K 15/02* (2006.01)
(52) U.S. Cl.
USPC ......................................... 358/3.28; 235/494

(58) Field of Classification Search
USPC ......................................... 358/3.28; 235/494
See application file for complete search history.

(56) References Cited

U.S. PATENT DOCUMENTS

2006/0097062 A1* 5/2006 Cheong et al. ................. 235/494
2007/0177824 A1* 8/2007 Cattrone et al. .............. 382/306

FOREIGN PATENT DOCUMENTS

| JP | 2009-20746  | 1/2009 |
| JP | 2009-116795 | 5/2009 |

OTHER PUBLICATIONS

K. Ito et al. "Paper Document Security" *Fuji Xerox technical report*, No. 15, P. 32-41, 2005; URL:htt.://www/fujixerox.co.jp/company/tr/15/downloadhdf/t4.pdf.

* cited by examiner

*Primary Examiner* — King Poon
*Assistant Examiner* — Andrew H Lam
(74) *Attorney, Agent, or Firm* — Edwards Wildman Palmer LLP; David G. Conlin; David A. Tucker

(57) ABSTRACT

A gradation pattern on the basis of the second data for the security of predetermined image data and the details data showing the detail information of a specific image of the image data is provided to a two-dimensional code on the basis of the first data for the security of the image data so that the data for the security of the image data is efficiently added to the image data in a limited space.

15 Claims, 22 Drawing Sheets

ORIGINAL DOCUMENT

VISIBLE WATERMARK
INFORMATION PATTERN

VISIBLE WATERMARK
INFORMATION PATTERN
WITH WHICH THE ORIGINAL
DOCUMENT DOES NOT OVERLAP

PRINTED MATERIAL

F I G. 6

QR CODE DATA 1 (BLACK)
MICRO GRADATION DATA 0

| 0 | 10 | 20 | 30 | 30 | 30 | 30 | 30 |
|---|----|----|----|----|----|----|----|
| 10 | 10 | 20 | 30 | 20 | 20 | 20 | 30 |
| 20 | 20 | 20 | 30 | 10 | 10 | 20 | 30 |
| 30 | 30 | 30 | 30 | 0 | 10 | 20 | 30 |
| 30 | 20 | 10 | 0 | 30 | 30 | 30 | 30 |
| 30 | 20 | 10 | 10 | 30 | 20 | 20 | 20 |
| 30 | 20 | 20 | 20 | 30 | 20 | 10 | 10 |
| 30 | 30 | 30 | 30 | 30 | 20 | 10 | 0 |

QR CODE DATA 0 (WHITE)
MICRO GRADATION DATA 0

| 225 | 235 | 245 | 255 | 255 | 255 | 255 | 255 |
|-----|-----|-----|-----|-----|-----|-----|-----|
| 235 | 235 | 245 | 255 | 245 | 245 | 245 | 255 |
| 245 | 245 | 245 | 255 | 235 | 235 | 245 | 255 |
| 255 | 255 | 255 | 255 | 225 | 235 | 245 | 255 |
| 255 | 245 | 235 | 225 | 255 | 255 | 255 | 255 |
| 255 | 245 | 235 | 235 | 255 | 245 | 245 | 245 |
| 255 | 245 | 245 | 245 | 255 | 245 | 235 | 235 |
| 255 | 255 | 255 | 255 | 255 | 245 | 235 | 225 |

QR CODE DATA 1 (BLACK)
MICRO GRADATION DATA 1

| 30 | 30 | 30 | 30 | 30 | 20 | 10 | 0 |
|----|----|----|----|----|----|----|---|
| 30 | 20 | 20 | 20 | 30 | 20 | 10 | 10 |
| 30 | 20 | 10 | 10 | 30 | 20 | 20 | 20 |
| 30 | 20 | 10 | 0 | 30 | 30 | 30 | 30 |
| 30 | 30 | 30 | 30 | 0 | 10 | 20 | 30 |
| 20 | 20 | 20 | 30 | 10 | 10 | 20 | 30 |
| 10 | 10 | 20 | 30 | 20 | 20 | 20 | 30 |
| 0 | 10 | 20 | 30 | 30 | 30 | 30 | 30 |

QR CODE DATA 0 (WHITE)
MICRO GRADATION DATA 1

| 255 | 255 | 255 | 255 | 255 | 245 | 235 | 225 |
|-----|-----|-----|-----|-----|-----|-----|-----|
| 255 | 245 | 245 | 245 | 255 | 245 | 235 | 235 |
| 255 | 245 | 235 | 235 | 255 | 245 | 245 | 245 |
| 255 | 245 | 235 | 225 | 255 | 255 | 255 | 255 |
| 255 | 255 | 255 | 255 | 225 | 235 | 245 | 255 |
| 245 | 245 | 245 | 255 | 235 | 235 | 245 | 255 |
| 235 | 235 | 245 | 255 | 245 | 245 | 245 | 255 |
| 225 | 235 | 245 | 255 | 255 | 255 | 255 | 255 |

FIG. 10A
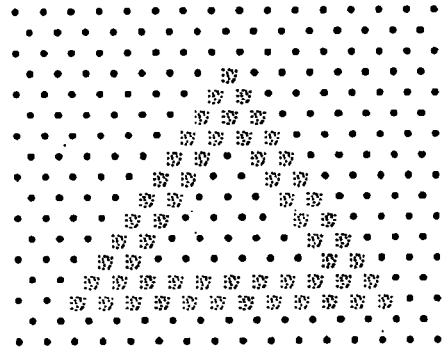
NO.1
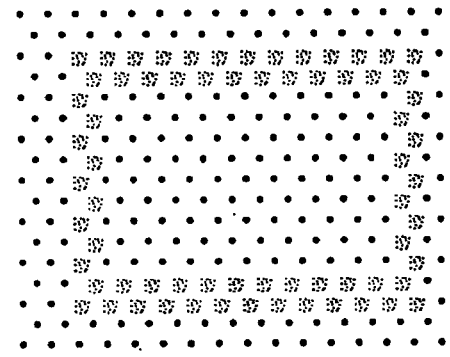
NO.2
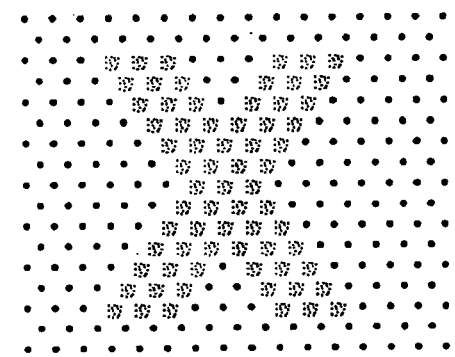
NO.3
FIG. 10B
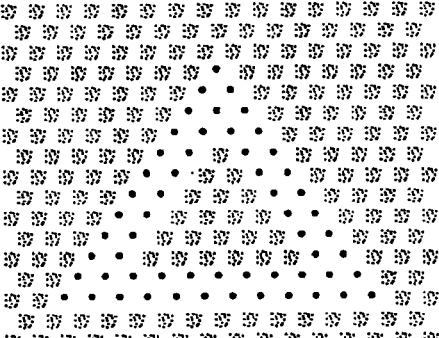
NO.4
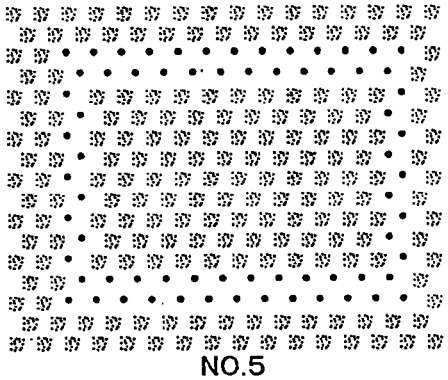
NO.5
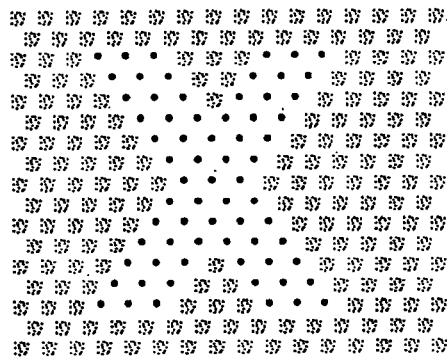
NO.6

F I G. 1 2
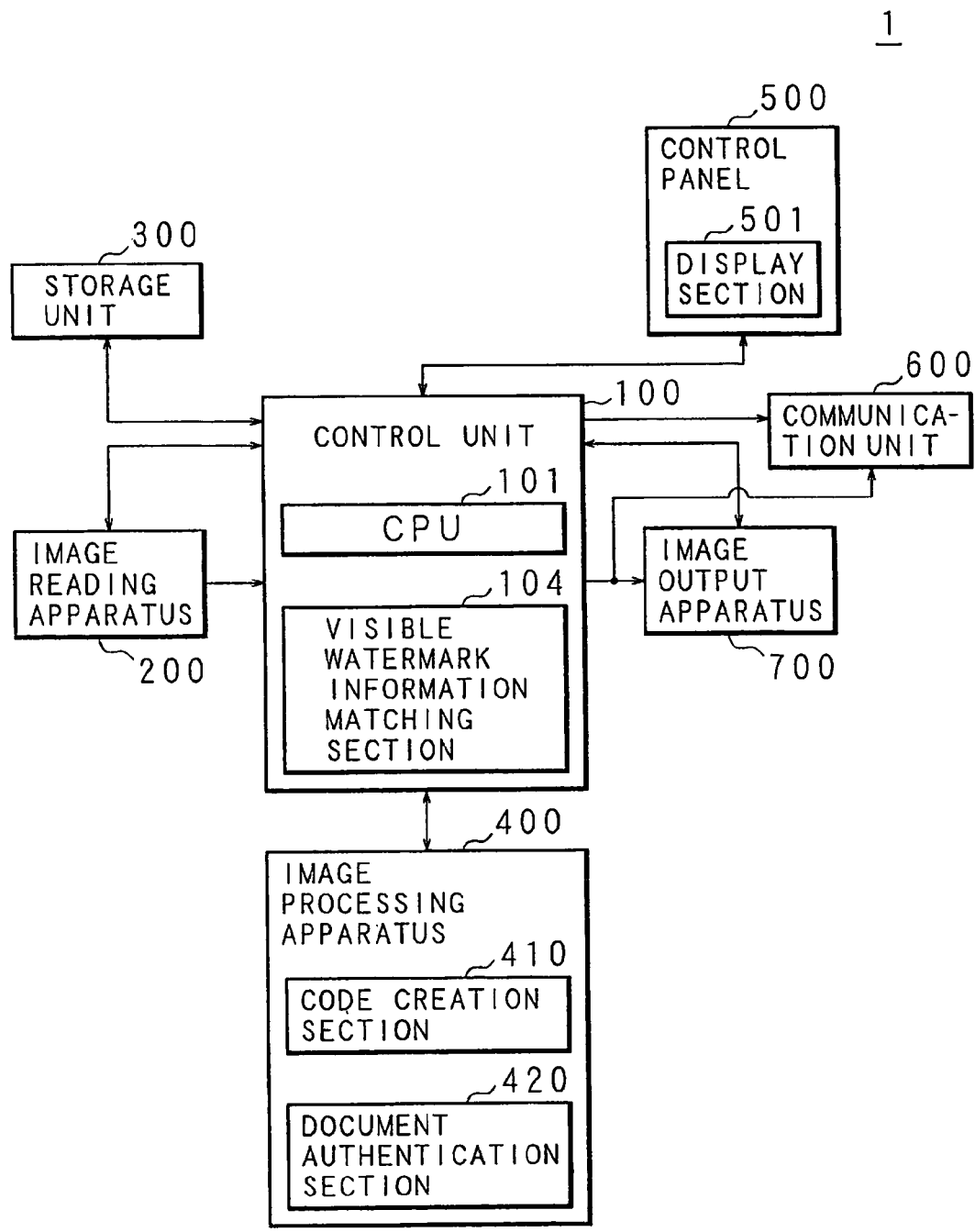

FIG. 22A
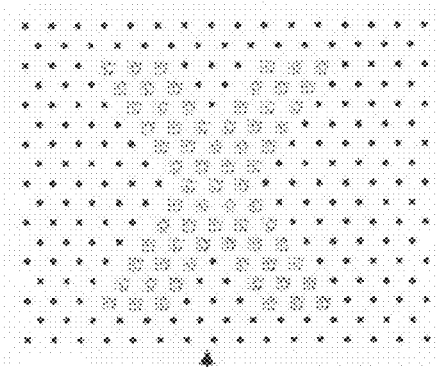
ENLARGEMENT
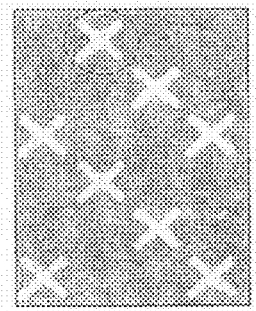
DOCUMENT
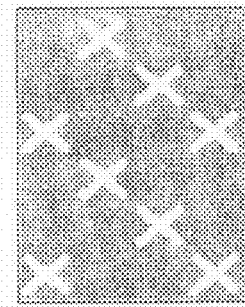
PRINTED MATERIAL
FIG. 22B
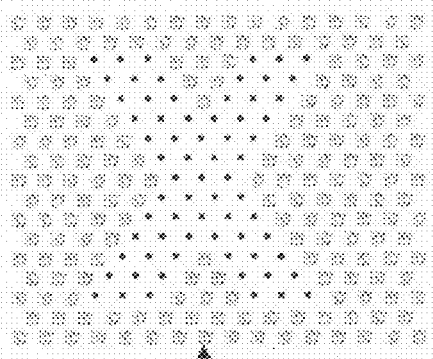
ENLARGEMENT
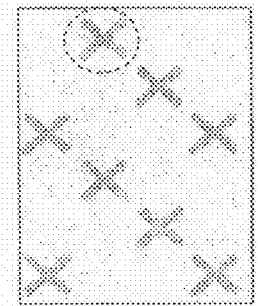
DOCUMENT
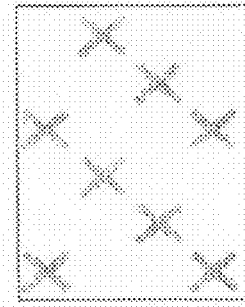
PRINTED MATERIAL IMAGE PROCESSING, READING OR FORMING APPARATUS AND METHOD FOR ADDING SPECIFIC IMAGE DATA TO OBTAINED IMAGE DATA WHILE ENCRYPTING DETAILS DATA SPECIFYING SPECIFIC DATA AND ADDING ENCRYPTED DETAILS DATA TO OBTAINED IMAGE DATA, AND NON-TRANSITORY RECORDING MEDIUM RECORDING PROGRAM FOR CAUSING COMPUTER TO FUNCTION AS THE SAME

CROSS-REFERENCE TO RELATED APPLICATIONS

This Nonprovisional application claims priority under 35 U.S.C. §119(a) on Patent Application No. 2009-148028 filed in Japan on Jun. 22.2009, the entire contents of which are hereby incorporated by reference.

BACKGROUND

1. Technical Field

The present invention relates to an image processing apparatus for processing image data on the basis of the obtained data, an image reading apparatus having the image processing apparatus, an image forming apparatus having the image processing apparatus, an image processing method for image data on the basis of the obtained data, and a recording medium in which a computer program for processing image data on the basis of the data obtained in a computer.

2. Description of Related Art

Electronization of information has been largely proceeded as well as printers, copying machines and multi-function printers have been widely spread these days. This results in increasing cases where document data is created on the basis of a document of a sheet-shaped recording medium (hereinafter simply referred to as a document) so as to deliver the created document data.

Meanwhile, as a method for adding additional data to a printed matter, a method using a two-dimensional code has been widely spread. An example of the two-dimensional code is a QR (Quick Response) code. Cellular phones now widespread among a large number of people are equipped with a function to read a QR code. Also, a function to create a QR code is provided as a function of a cellular phone in some cases and is provided as software for a computer in other cases.

A so-called data embedding technology for embedding additional data into a document while taking the layout into consideration without making the human eye feel the deterioration of the image quality so much without requiring an area to which a code is added separately, unlike the case where a QR code is added to a document (printed material), has been developed. As one such example, microgradation for displaying additional binarized data as a predetermined pattern having a difference in the density in the design pattern, which is a technology for embedding additional data into a design pattern that is the page background of a document, has been disclosed (Kensuke Ito and 4 others, "Paper Document Security" Fuji Xerox Online Technical Report, searched on Nov. 29, 2008, http://www.fujixerox.co.jp/company/tr/15/download/pdf/t_4.pd f).

Meanwhile, a text hiding technology using visible watermark information in a halftone screen (hereafter, in this invention, we express visible watermark information in a halftone screen technology as visible watermark information technology, for short.) has been known as a method for checking the unauthorized copying of a document. The text hiding technology using visible watermark information in a halftone screen uses the fact that printers have higher resolution than scanners. In further detail, as shown in FIG. 21A, a hidden text "Copy Strictly Prohibited" is printed with such a resolution that can be read by scanners, and at the same time, a pattern (visible watermark information in a halftone) with such a resolution that cannot be read by scanners is printed on the entire printed surface of the recording medium for the purpose of making it difficult for the human eye to perceive the above described hidden text "Copy Strictly Prohibited" and thus, the document is complete. As a result, when this document is copied, as shown in FIG. 21B, the visible watermark information in a halftone printed in the document cannot be read by the scanner, and therefore, is not copied so that only the hidden text "Copy Strictly Prohibited" having such a resolution that can be read by the scanner is copied, and thus, copying can be checked.

The visible watermark information technology is a technology for embedding a subtle change that cannot be perceived by the human eye when the document is outputted so that the information can be detected if necessary.

In the following, an another example of the visible watermark information technology is described. FIGS. 22A and 22B are diagrams for illustrating visible watermark information. The visible watermark information "x" characters are embedded in the documents in FIGS. 22A and 22B with a subtle difference in the resolution from the visible watermark information in a halftone, which is difficult for the human eye to perceive. As can be seen from the diagrams showing an enlargement of each visible watermark information "x" character and its periphery, the visible watermark information "x" character is made up of dots with a great number of lines (resolution being high), while the visible watermark information in a halftone in its periphery is made up of dots with a small number of lines (resolution being low) in FIG. 22A. The visible watermark information "x" character is made up of dots with a small number of lines, while the visible watermark information in a halftone and its periphery is made up of dots with a great number of lines in FIG. 22B. The areas with a small number of lines can be detected by scanners, while the areas with a great number of lines cannot be detected by scanners. Accordingly, the visible watermark information "x" characters having such a resolution that cannot be read by scanners are white in the copy in the case where the document in FIG. 22A is copied, while only the visible watermark information "x" characters having such a resolution that can be read by the scanner are copied in the case where the document in FIG. 22B is copied, and thus, copying can be checked.

SUMMARY

However, as for the documents where document data is printed in a recording medium, it is difficult to specify, "Who prepared the document?" after once the document is released from the hands of the preparer of the document, and in some cases, it is difficult to confirm the contents of the document. Furthermore, a third person who is not authorized by the preparer of the document can easily copy, read and handle the document as described above (document data), and a problem arises in that security is lacking.

In the text hiding technology using visible watermark information in a halftone screen, though copying can be checked because a hidden text "No Copying" appears when copied, the document ends up being copied and a problem arises in that the document cannot be prevented from being copied.

In addition, QR codes have a predetermined limitation in the amount of data that can be contained, and there is a problem in that a certain amount of data or more cannot be QR coded. In the case of the QR code standard version 40 (177× 177), for example, the maximum number of "Chinese and Japanese kana" characters that can be contained is 1817.

Furthermore, as for the micro gradation in Non-Patent Document 1, it is difficult to expect the visible watermark information pattern (set of dots), and in the case where the design pattern includes a high frequency component, it is difficult to read the pattern embedded in the design pattern, and thus, a problem arises in that a complex process is required in order to avoid this.

Here, there is a problem with the QR codes and micro gradation such that falsification is easy when a person with malicious intent separates each recording medium (paper, for example) portion where there is a QR code or micro gradation from the rest of the recording medium and pastes it to another document.

The present invention is provided in view of the above described situations, and an object thereof is to provide an image processing apparatus, an image processing method, and a recording medium storing a computer program where additional image data for an additional image showing a gradation pattern on the basis of second data concerning the security of the image data and details data showing the detail information of a specific image in a two-dimensional code on the basis of first data concerning the security of the obtained image data, is added to the image data so that a greater number of pieces of data concerning the security can be added to a limited space, and at the same time, security can be enhanced without being affected by a high frequency component, such as of a fine line pattern, during the process of outputting the image data to a sheet, for example, and the falsification of the output can be checked and an illegal process can be prevented as a result of this checking through the matching of the specific image of the output on the basis of the details data after the outputting process.

Another object of the present invention is to provide an image processing apparatus, an image processing method, and a recording medium storing a computer program where in the case where the additional image and specific image are added to the obtained image, the first data, second data and the details data showing the detail information of the specific image are separated from the additional image data for the additional image, and thus, the image data is processed on the basis of the results of matching of the first data and second data and/or the details data so that security can be enhanced in the process of the output where the image (image data) is formed in a predetermined recording medium and an unauthorized process can be prevented from being carried out on the output, for example, and the correspondence between the specific image of the output and the details data is matched so that the falsification of an output where each additional image portion of the output is separated from the rest of the recording medium and pasted to another output can be particularly checked.

Still another object of the present invention is to provide an image reading apparatus where additional image data of an additional image on the basis of first data and second data concerning the security of the image data and the details data showing the detail information of a specific image is added to the image data read from a document so that a greater number of pieces of data concerning the security can be added to a limited space, and at the same time, security can be enhanced without being affected by a high frequency component during the process of outputting the read image data to a sheet, for example, and the falsification of the output can be checked and an illegal process can be prevented as a result of this checking through the matching of the specific image of the output on the basis of the details data after the outputting process.

Yet another object of the present invention is to provide an image reading apparatus where in the case where the additional image and specific image are added to the image data read from a document, the first data, second data and the details data showing the detail information of the specific image are separated from the additional image data for the additional image, and thus, the image data is processed on the basis of the results of matching of the first data and second data and/or the details data so that security can be enhanced in the process for the output where the image data is formed in a predetermined recording medium and an unauthorized process can be prevented from being carried out on the output, for example, and the correspondence between the specific image of the output and the details data is matched so that the falsification of an output where each additional image portion of the output is separated from the rest of the recording medium and pasted to another output can be particularly checked.

Still yet another object of the present invention is to provide an image forming apparatus where additional image data of an additional image on the basis of first data and second data concerning the security of the image data and the details data showing the detail information of a specific image added to an image to be formed is added to the image data of the image, and an image on the basis of the image data is formed on a sheet, for example, so that more data concerning the security can be added to a limited space, and at the same time, security can be enhanced during the process of outputting (forming) the image data on a sheet, and the falsification of the output can be checked and an illegal process can be prevented as a result of this checking through the matching of the specific image of the output on the basis of the details data after the output process.

Another object of the present invention is to provide an image forming apparatus where in the case where image data of an image to which the additional image and specific image are added is obtained from a document, the first data, second data and the details data showing the detail information of the specific image are separated from the additional image data for the additional image, and thus, the image on the basis of the image data is formed on a sheet on the basis of the results of matching of the first data and second data and/or the details data so that security can be enhanced in the image formation of an image on a sheet on the basis of the image data and an unauthorized image can be prevented from being formed for the image data, and the correspondence between the specific image of the image and the details data is matched so that the falsification of an output where each additional image portion of the document is separated from the rest of the document and pasted to another output can be particularly checked.

According to the present invention, in the case where image data is obtained, the code generating section generates the image data of the two-dimensional code on the basis of the first data, and the pattern generating section generates the pattern image data on the basis of the second data encrypted by the encrypting section and the details data. The adding section adds the additional image data of the additional image on the basis of the image data of the generated two-dimensional code and the pattern image data to the image data.

According to the present invention, the specific image data selected and received by the selecting and receiving section is obtained from the storage section, and the obtained specific image data is added to the obtained image data.

According to the present invention, the specific image is a visible watermark information in a halftone screen image or a watermark image, and the details data showing the detail information of the visible watermark information in a halftone screen image or the watermark image is encrypted by the encrypting section.

According to the present invention, the obtaining section obtains image data from the image to which the additional image and specific image generated by the image processing apparatus are added, and the separation section separates the first data, second data and details data from the additional image data. The matching section matches the first data and second data separated by the separation section and carries out a process for the image data on the basis of the results of the matching and/or the details data.

According to the present invention, in the case where the determining section determines that the detail information of the specific image on the basis of the image data obtained by the obtaining section corresponds to the details data, a process is carried out on the image data. In the case where the detail information of the specific image is determined not to correspond to the details data, no process is carried out on the image data.

According to the present invention, the third data receiving section receives a specific user's name as the third data, for example, and the matching section matches the specific user's name (third data) with the first data or second data so that the following process is carried out on the basis of the results of the matching, for example, on the basis of whether or not the third data is included in the first data or second data.

According to the present invention, additional image data of the additional image on the basis of the image data of the two-dimensional code generated by the code generating section in the image processing apparatus and the pattern image data generated by the pattern generating section in the image processing apparatus and the specific image data of the specific image are added to the image data read from a document by the adding section in the image processing apparatus.

According to the present invention, in the case where the reading section reads the image data to which the additional image data generated by the image processing apparatus and the specific image data are added, the separation section of the image processing apparatus separates the first data, second data and details data from the additional image data, and the matching section of the image processing apparatus matches the first data and second data. The read image data is processed on the basis of the results of the matching by the matching section and/or the history data.

According to the present invention, the image processing apparatus generates out put image data where the additional image data and specific image data are added to predetermined obtained image data, and an image on the basis of the out put image data is formed on a sheet, for example.

According to the present invention, in the case where image data to which the additional image data and specific image data are added is obtained, the matching section of the image processing apparatus carries out matching and an image on the basis of the obtained image data is formed on a sheet, for example, on the basis of the results of the matching and/or the details data in the image data.

According to the present invention, the recording medium stores the computer program. A computer reads out the computer program from the recording medium so that the image processing apparatus, image reading apparatus, image forming apparatus and image processing method are implemented by the computer.

Furthermore, according to the present invention, image data of a two-dimensional code is generated on the basis of the first data for the security of the obtained image data, and the second data for the security of the obtained image data and the details data of the specific image are encrypted so that pattern image data showing a gradation pattern in a cell of the two-dimensional code is generated on the basis of the encrypted second data and details data. In addition, additional image data of an additional image on the basis of the image data of the two-dimensional code and the pattern image data is added to the obtained image data.

According to the present invention, image data is obtained from the image to which the additional image and specific image are added, and the first data, second data and details data are separated from the additional image data of the additional image so that a process is carried out on the image data on the basis of the results of the matching of the separated first data and second data and/or the details data.

According to the present invention, the gradation pattern on the basis of the second data for the security of a predetermined image data and the details data showing the detail information of the specific image on the basis of the image data is shown in the two-dimensional code on the basis of the first data for the security of the image data, and therefore, more data for the security can be added to a limited space and the security can be enhanced in the process of outputting the image data to a sheet, for example, without being affected by high frequency components, and at the same time, unauthorized copying can be prevented and falsification of the output can be checked through the matching of the specific image in the output on the basis of the details data after the outputting process.

According to the present invention, in the case where the additional image and specific image are added to an obtained image, the first data, second data and details data showing the detail information of the specific image are separated from the additional image data of the additional image, and the image data is processed on the basis of the results of the matching of the first data and the second data and/or the details data, and therefore, the security can be enhanced in the process for the output where the image (image data) is formed on a predetermined recording medium, for example, and an unauthorized process can be prevented from being carried out on the output, and the correspondence between the specific image of the output and the details data can be matched so that falsification of the output, particularly by separating each additional image portion of the output from the rest of the recording medium and pasting it to another output, can be prevented.

The above and further objects and features will more fully be apparent from the following detailed description with accompanying drawings.

BRIEF DESCRIPTION OF THE SEVERAL VIEWS OF THE DRAWINGS

FIG. 6 is a diagram illustrating an example of a density value combination table that shows micro gradation data in a cell of the QR code of Embodiment 1 of the present invention;

FIG. 10A and FIG. 10B are diagrams illustrating thumbnails for the visible watermark information patterns stored in the storage apparatus in the digital multi-function peripheral of Embodiment 1 of the present invention;

FIG. 12 is a block diagram illustrating a principal configuration of the digital multi-function peripheral of Embodiment 2 of the present invention;

FIG. 22 is a diagram for illustrating a conventional visible watermark information.

DETAILED DESCRIPTION

In the following, modes of the image processing apparatus, the image reading apparatus, the image forming apparatus, the image processing method, the computer program and the recording medium according to the present invention, which are applied to a digital multi-function peripheral having a copying function, a printing function and the like, are described concretely in reference to the drawings. Here, a QR code is used as an example of a two-dimensional code in order to make the description easy.

First Embodiment

In the image forming apparatus of Embodiment 1 of the present invention, a process of adding a visible watermark information pattern (specific image) made of a text and a marking is additionally carried out on an image where the below described gradation QR code on the basis of the data for the security of an image to be outputted (hereinafter referred to as target image) is added to the target image so that an image for output is formed.

Figure 1:
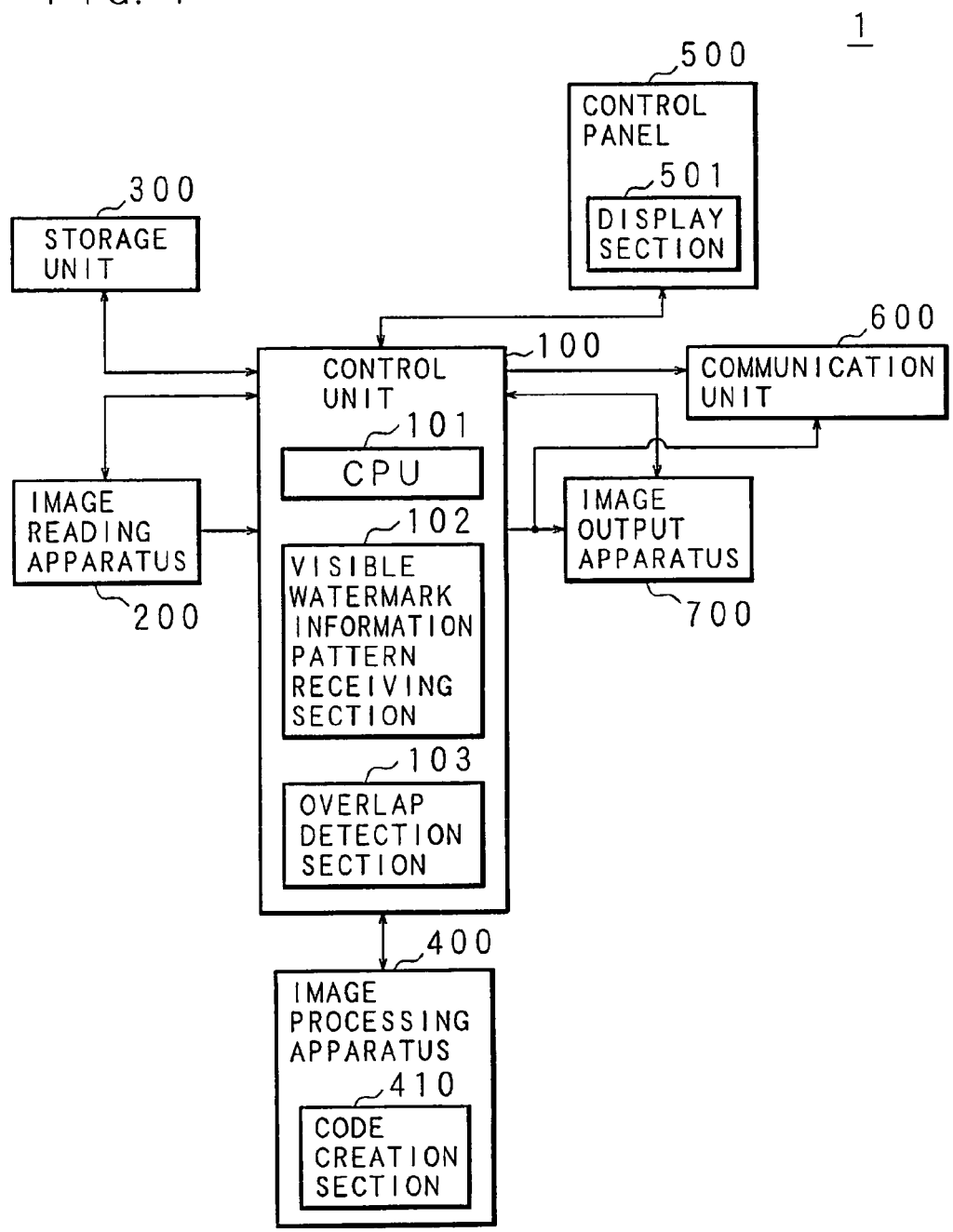
FIG. 1 is a block diagram illustrating a principal configuration of a digital multi-function peripheral according to Embodiment 1.

FIG. 1 is a block diagram illustrating a principal configuration of a digital multi-function peripheral 1 according to Embodiment 1. The digital multi-function peripheral 1 of Embodiment 1 includes a control unit 100, an image reading apparatus 200 (reading section), an image processing apparatus 400, an image output apparatus 700, a storage unit 300 (storage section), a communication unit 600 and a control panel 500 (receiving section).

The control unit 100 includes a CPU 101 (process section) for controlling the above described hardware and a RAM (not shown) for temporarily storing data required for the control (for example, the below described public key). In addition, the control unit 100 further includes a visible watermark information pattern receiving section 102 (selection receiving section) and an overlap detection section 103.

A predetermined program is downloaded into the control unit 100 from the storage unit 300 if necessary so that the downloaded program is run, and thus, the digital multi-function peripheral 1 operates as the image processing apparatus, the image reading apparatus and the image forming apparatus including the image processing apparatus, and/or the image reading apparatus As described below, the visible watermark information pattern receiving section 102 receives an instruction to select one or more visible watermark information patterns from among a number (plurality) of visible watermark information patterns stored in the storage unit 300 from the user from the control panel 500.

The overlap detection section 103 detects the overlap of the target image with the visible watermark information of text of the visible watermark information pattern during the process of generating an image for output by adding a visible watermark information pattern to the target image.

Figure 2A:
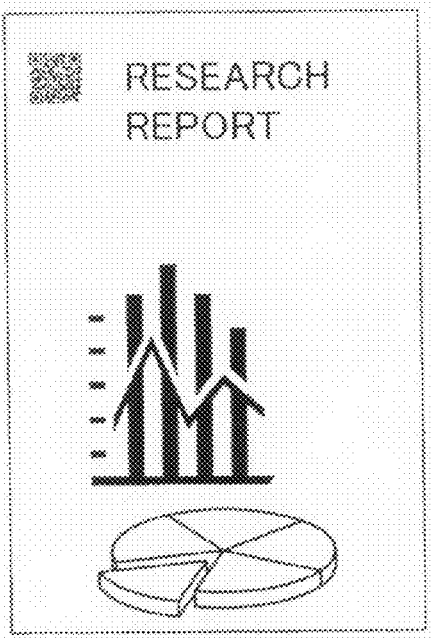
FIG. 2A to FIG. 2D are diagrams for illustrating the process of detecting overlap.
Figure 2B:
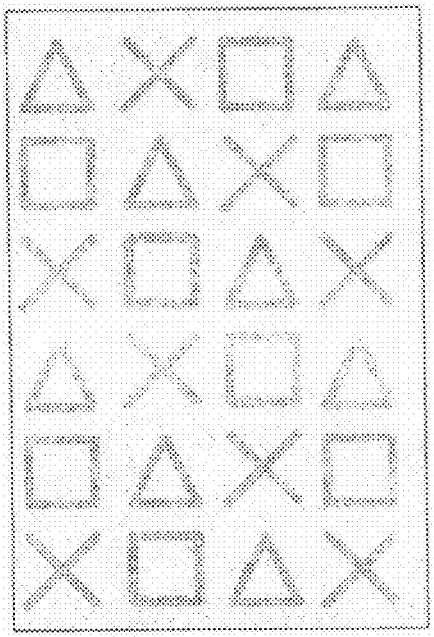

In the following, detection of the overlap by the overlap detection section 103 is described. FIG. 2A to FIG. 2D are diagrams for illustrating the process of detecting overlap. FIG. 2A shows an image where a QR code is added to the target image (hereinafter referred to as temporary document image), and the following description relates to an example of a case where a visible watermark information pattern having visible watermark information of text made of a combination of shapes "Δ, □ and x" as show in FIG. 2B is added to the temporary document image.

The process of detecting overlap is carried out by storing the temporary document image in FIG. 2A and the visible watermark information pattern in FIG. 2B in a frame memory and detecting the overlap of a portion corresponding to "Δ, □ and x" (visible watermark information of text) in the visible watermark information pattern or the entire area of the visible watermark information pattern with the temporary document image. This detection is carried out on the basis of the coordinates of the pixels for the image data of the temporary document image and the visible watermark information pattern (visible watermark information of text), for example.

Figure 2C:
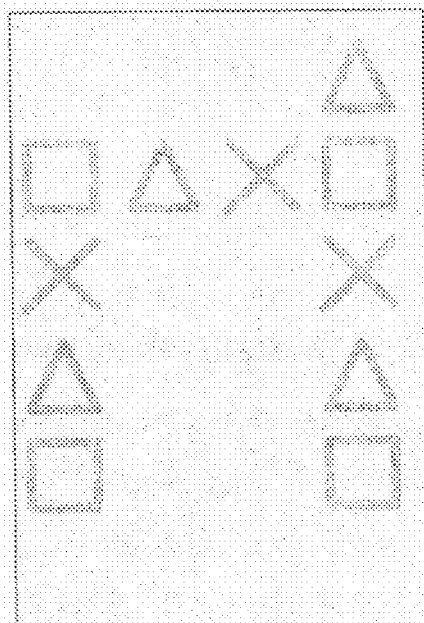
Figure 2D:
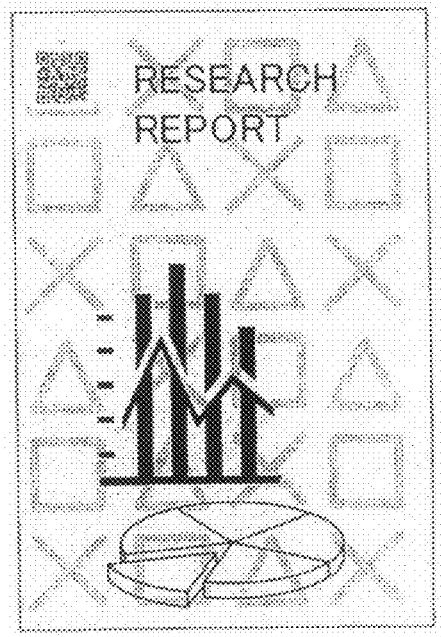

In the case where the overlap detection section 103 detects an overlapping visible watermark information of text, this visible watermark information of text is removed so that a visible watermark information pattern consisting of the remaining visible watermark information of text image (as shown in FIG. 2C) is generated, and the below described details data specifying a state of the visible watermark information pattern is prepared and encrypted. FIG. 2D shows an example of a printed material on the basis of the output image where the visible watermark information pattern in FIG. 2B is added to an image to which the gradation QR code is added.

The storage unit 300 is, for example, a nonvolatile semiconductor memory and stores user names, each user's password and each user's secret key (and public key), which are associated with each other. In addition, image data for image processes, control programs for controlling the hardware sections, programs for generating a secret key used for the encryption of the below described second data or a decoding key, programs for adding image data of the below described gradation QR code, programs for displaying input screens for facilitating the input of a user name and password, programs for displaying a selection screen for receiving a selection whether or not processing is to be continued, and a number of image data of visible watermark information patterns (hereinafter referred to as visible watermark information pattern data) are stored in advance.

Furthermore, the control panel 500 includes function buttons related to significant functions of the digital multi-function peripheral, numeric keys, an enter key, moving keys and a display section 501. The function buttons are buttons for instructing execution of "transmission of a facsimile", "copying", "printing", "transmission of an e-mail" and the like. The enter key is a key for defining a received instruction. The moving keys are keys for specifying a position of a QR code described later. The display section 501 is a liquid crystal display or the like.

The image reading apparatus 200 optically reads a document to be processed so as to obtain image data of the document. Moreover, the image reading apparatus 200 includes an optical unit (reading section). The optical unit includes a light source for irradiating a document, such as an image sensor like a CCD (Charge Coupled Device), for reading a document. The image reading apparatus 200 makes an optical image, which is obtained through reflection from a document set in a prescribed reading position, focus on the image sensor, so as to output analog electric signals of RGB (R: red, G: green and B: blue). The analog electric signals outputted from the image reading apparatus 200 are inputted to the image processing apparatus 400.

The communication unit 600 includes a network card, a modem and the like so as to send image data having been processed by the image processing apparatus 400 to the external device. For example, the communication unit 600 sends an e-mail with image data attached to a specified destination.

The image output apparatus 700 forms an image based on image data outputted from the image processing apparatus 400 by outputting the image onto a sheet such as recording paper or an OHP film. For this purpose, the image output apparatus 700 includes a photoreceptor, a charger, a laser writing device, a developer, a transferring device and the like (not shown). The charger charges the photoreceptor with a prescribed potential. The laser writing device forms an electrostatic latent image on the photoreceptor by emitting laser beams in accordance with received image data from outside. The developer develops the electrostatic latent image formed on the photoreceptor by supplying a toner. The transferring device transfers a toner image thus formed on the photoreceptor onto paper. The image output apparatus 700 forms an image desired by a user on a sheet by employing an electrophotographic method. Incidentally, although the image output apparatus 700 herein includes the laser writing device and forms an image by the electrophotographic method, it may be an apparatus for forming an image by an ink-jet method, a thermal transferring method, a sublimation method or the like.

The image processing apparatus 400 generates image data of digital format on the basis of an analog electrical signal which is inputted through the image reading apparatus 200, reads out the image data stored in the storage unit 300 so as to carry out a process in accordance with the type of image, and generates output image data of an output image. In addition, the image processing apparatus 400 includes a code creation section 410. The code creation section 410 generates image data of a gradation QR code to be added to target image data of the target image which is inputted through the image reading apparatus 200, for example, and adds the image data and the visible watermark information pattern data selected following an instruction received from the control panel 500 to the target image data. The output image data generated by the image processing apparatus 400 to which the image data of the gradation QR code and the visible watermark information pattern data are added is outputted to the image output apparatus 700 or the communication unit 600.

Figure 3:
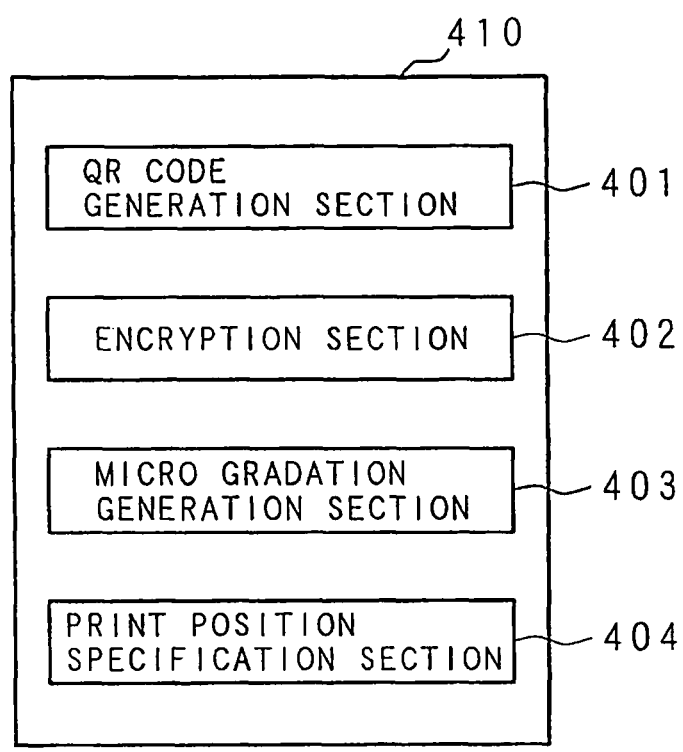
FIG. 3 is a functional block diagram illustrating a principal configuration of the code creation section in the digital multi-function peripheral of Embodiment 1 of the present invention.

FIG. 3 is a functional block diagram illustrating a principal configuration of the code creation section 410 in the digital multi-function peripheral 1 of Embodiment 1 of the present invention. The code creation section 410 includes a QR code generation section 401 (code generation section), an encryption section 402, a micro gradation generation section 403 (pattern generation section) and a print position specification section 404.

The QR code generation section 401 generates image data of a QR code to be added to the target image data on the basis of the first data for security in printing an image on the basis of the target image data obtained from the image reading apparatus 200, and transmitting the target image data together with e-mail as an attachment, or to the outside.

The encryption section 402 encrypts the second data for security in printing an image on the basis of the target image data obtained from the image reading apparatus 200, and transmitting the target image data together with e-mail as an attachment, or to the outside, and the details data representing the detail information of the visible watermark information pattern to be added to the target image data, by using the secret key of the person who generated the target image data, for example.

The details data encrypted by the encryption section 402 according to Embodiment 1 includes text specifying numbers to specify the visible watermark information of text included in the visible watermark information pattern which does not overlap with the target image, and position data to indicate the position of the visible watermark information of text which does not overlap with the target image, for example. The text specifying numbers are numbers included in a number of visible watermark information patterns stored in the storage unit 300 and allocated for the respective visible watermark information of texts, for example. Accordingly, by using the numbers, it is possible to specify the visible watermark information of text which is included in the visible watermark information patterns and does not overlap with the target image. Here, the details data is not limited to this above mentioned, and may specify all visible watermark information of texts included in the visible watermark information patterns.

The first data and the second data are a name, an ID (IDentification) number, a contact address and the like of a creator or a user of image data and are data by which the creator or the user of the image data may be specified. Furthermore, the first data and the second data are not always identical to each other but may be different from each other.

At this point, a secret key and a public key are widely used in a "public cryptography" in general. Now, procedures in processing of "digital signature" employing the public cryptography will be simply described.

(1) A creator (a sender) of electronic data of a document prepares (creates) a secret key and a public key. (2) The creator (the sender) of the electronic data informs a receiver of the electronic data of the public key by using an e-mail, Web, a letter or the like. (3) The creator (the sender) of the electronic data encrypts the electronic data by using the secret key created in the procedure (1) and sends the encrypted electronic data to the receiver by using an e-mail, FTP (File Transfer Protocol), a printed matter or the like. (4) The receiver having received the encrypted electronic data decodes the encrypted electronic data sent in the procedure (3) by using the public key sent in the procedure (2). (5) When the encrypted electronic data can be decoded in the procedure (4), the creator (the sender) of the electronic data can be specified.

Furthermore, RSA (Rivest-Shamir-Adleman) cryptography is generally known about encryption and decode executed by using a secret key and a public key. Now, the outline of the RSA cryptography will be described.

A public key of the RSA cryptography is composed of a pair of natural numbers e and n, wherein n is a product of two prime numbers p and q, and e is a positive integer satisfying gcd (e, $\phi(n)$)=1 (gcd: greatest common divisor). At this point, $\phi(n)$ is the Euler function and is represented as $\phi(n)=\phi(p)\phi(q)=(p-1)(q-1)$. It is assumed that there is an inverse element of the number e modulo $\phi(n)$, which is indicated as d ($1 \leq d \leq p-1$). In this case, a relationship of $ed \equiv 1$ (mod $\phi(n)$) holds. At this point, a relationship of $x^{ed} \equiv x$ (mod n) holds with respect to x ($0 \leq x < n$) in accordance with the Euler's theorem. Accordingly, when the number d is known, x can be obtained on the basis of $x^e$ owing to the aforementioned properties. In other words, a cipher $x^e$ is created by encrypting x ($0 \leq x < n$) by using the number e (e: encrypting key (secret key)). The cipher $x^e$ is decoded by using the number d (d: decoding key (a public key)).

Incidentally, the secret key thus obtained may be inputted through a keyboard or the like when, for example, the document creator creates the document. Furthermore, the secret key may be precedently stored in the storage unit 300 in association with identification data of the user. In the following description, it is assumed that the secret key is precedently stored in the storage unit 300.

The micro gradation generation section 403 generates image data of a micro gradation (gradation pattern) having a number of regions with different densities which are shown in the cell of the QR code, on the basis of the second data and details data encrypted by the encryption section 402 (hereinafter referred to as encrypted data).

Figures 4A, 4B:
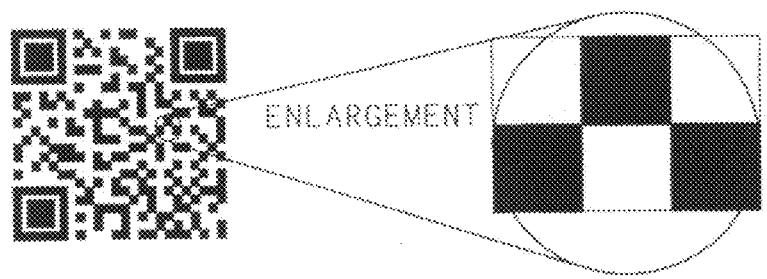
FIG. 4A and FIG. 4B are diagrams for illustrating micro gradation added by the micro gradation generation section in the digital multi-function peripheral of Embodiment 1 of the present invention.

Now, generation of a micro gradation and addition of a QR code executed by the micro gradation generation section 403 will be described. It is herein assumed that the micro gradation is created on the basis of the encrypted data. FIGS. 4A and 4B are explanatory diagrams explaining addition of the micro gradation performed by the micro gradation generation section 403 of the digital multi-function peripheral 1 of Embodiment 1. FIG. 4A and FIG. 4B illustrate an image of a QR code generated, for example, on the basis of a character string "This is a test.". FIG. 4B is an enlarged view of a part of the QR code of FIG. 4A (specifically, a circled portion of FIG. 4A). FIG. 4B illustrates information of "010101" assuming that a white portion indicates "0" and a black portion indicates "1".

Figure 5:
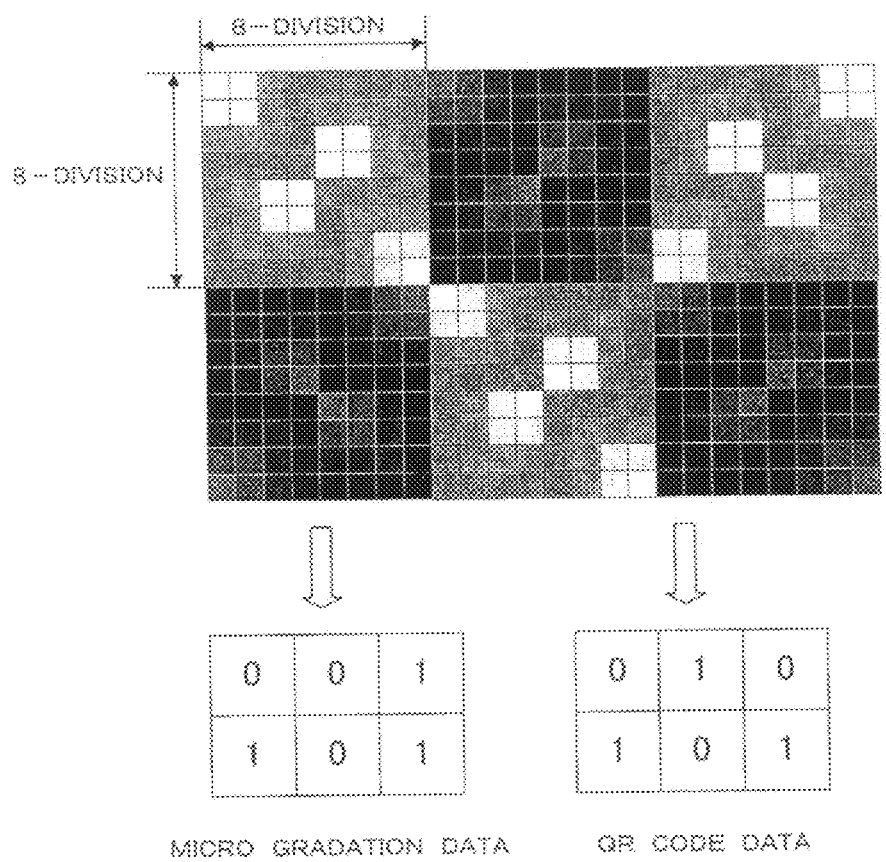
FIG. 5 is a diagram for illustrating a case where the data "001100," which is an encryption of the second data, is shown in a cell of the QR code in FIG. 4A as a micro gradation.
Figure 7:
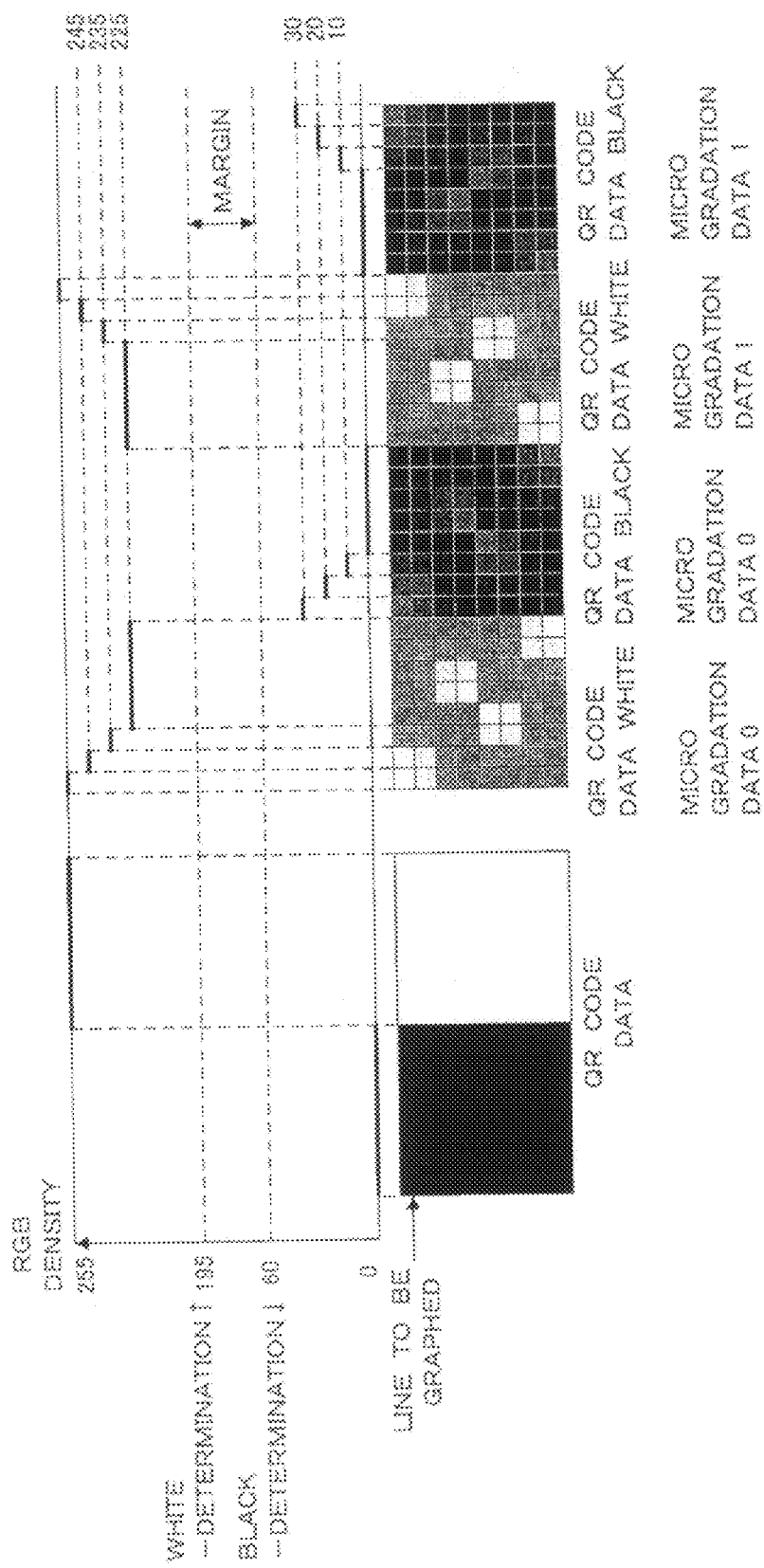
FIG. 7 is a diagram for illustrating the configuration and determination of the density value combination table of Embodiment 1 of the present invention.

FIG. 5 is an exemplary diagram illustrating an exemplary QR code in which information of the respective bits of the encrypted data "001100" is expressed by micro gradations in cells (that is, areas painted with black or white) of the QR code of FIG. 4A. Each cell of the QR code is divided vertically and laterally by 8 respectively, so as to express, with one cell, 1 bit of the encrypted data. The encrypted data is generated by changing the densities of the respective blocks obtained by finely dividing the cell. Data "0" and data "1" are distinguished from each other in accordance with a difference between pattern images. The pattern images include pattern images of data "0" and "1" obtained when a cell of a QR code is black and pattern images of data "0" and "1" obtained when the cell of the QR code is white. FIG. 6 is an exemplary diagram illustrating examples of a table of a combination of densities of micro gradation data expressed in cells of a QR code in Embodiment 1. In FIG. 6, black and white are respectively represented as "0" and "255" by using RGB densities, and density distributions of the four kinds of pattern images expressed in cells are illustrated. As a RGB density is smaller, a color corresponding to the RGB density is closer to black, and as the RGB density is larger, a color corresponding to the RGB density is closer to white. FIG. 7 is an explanatory diagram illustrating the structure and determination of a table of a combination of densities used in Embodiment 1. In determination of the QR code generated on the basis of the first data, a cell having a density of 195 or more is determined as white, and a cell having a density of 60 or less is determined as black. In the determination of black and white, densities from 60 to 195 correspond to a margin. On the other hand, with respect to a micro gradation based on the encrypted data, when a cell of a QR code is white, a color with a density of 0 through 30 is used for generating the micro gradation, and when a cell of the QR code is black, a color with a density of 225 through 255 is used for generating the micro gradation.

When a micro gradation representing information of 1 bit of the encrypted data is generated in one cell of a QR code in this manner, no high frequency component is included as an element of the micro gradation. In other words, since the micro gradation is generated by adding gradation in what is called a solid area, a frequency component of a white line or a black line is never included. Accordingly, the micro gradation can be generated with a very simple structure. Furthermore, since the micro gradation never includes a high frequency component, the micro gradation can be simply read, and there is no need to perform complicated processing for reading it.

Figure 8:
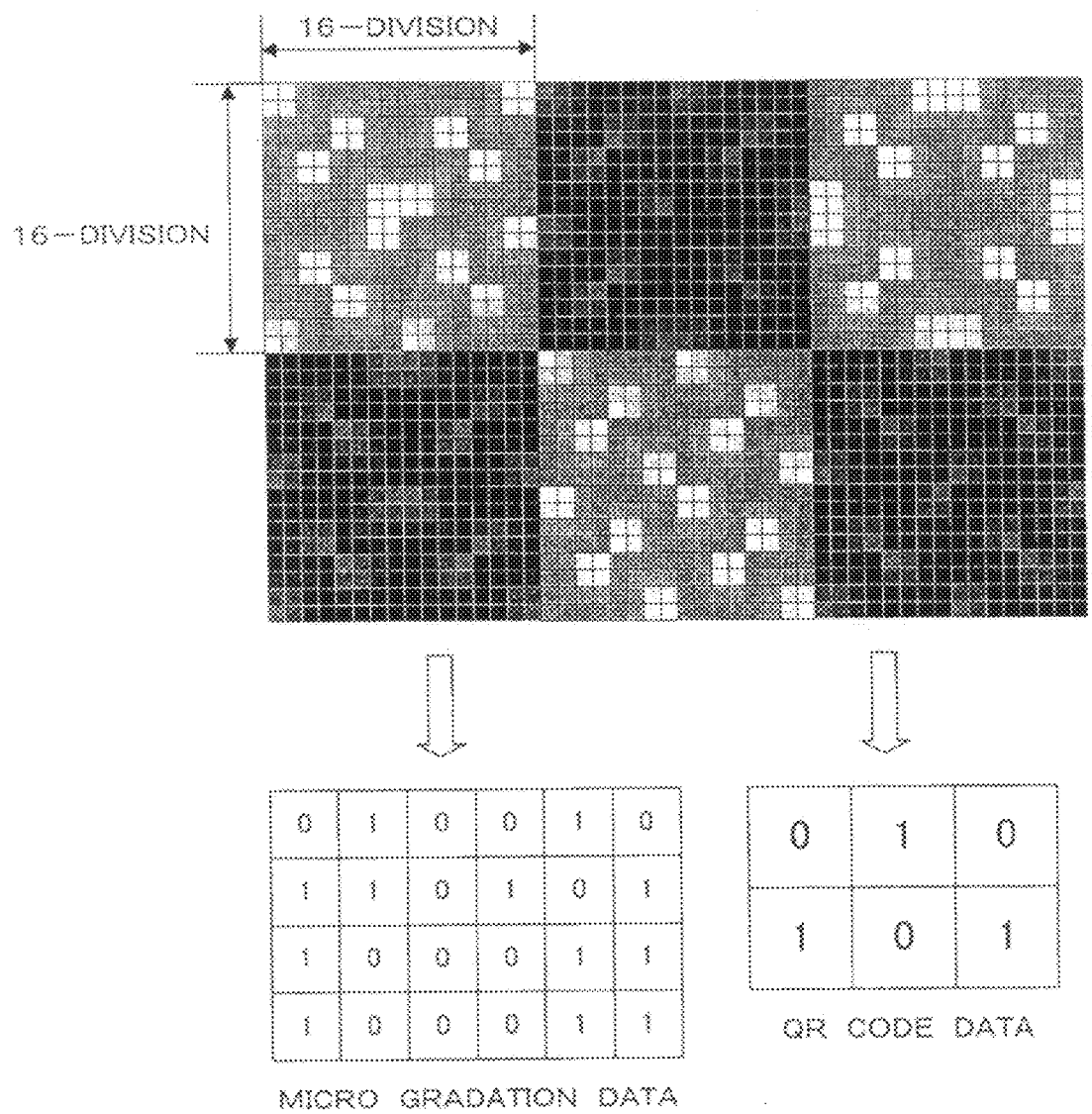
FIG. 8 is a diagram for illustrating another example of a density value combination table of Embodiment 1 of the present invention.

In FIG. 5, one cell of the QR code expresses the information of 1 bit of the encrypted data. When it is necessary to embed a larger amount of encrypted data, however, the amount of data can be increased by four times by dividing one cell of a QR code vertically and laterally by 16 respectively as illustrated in FIG. 8. Each cell of a QR code is divided by a number corresponding to an integral multiple of 8. (More precisely, a number for dividing a cell depends upon the number of blocks necessary for a micro gradation to express information of 1 bit. In Embodiment 1, since the micro gradation expresses the information of 1 bit by using 8×8 blocks, the number for dividing a cell is an integral multiple of 8.) Incidentally, it is assumed in Embodiment 1 that the QR code and the micro gradation are respectively expressed by black and white data (K data).

When the output image data is printed, the print position specification section 404 specifies a position where the QR code with the micro gradation added (hereinafter referred to as the gradation QR code) is to be recorded (hereinafter referred to as the print position) on recording paper. As a method for specifying the print position of a gradation QR code, the creator of the document arbitrarily inputs (specifies) the print position with the moving keys of the control panel 500 in creating the document. As another method, the gradation QR code is always printed in a constant position (for example, in a position at a right end of a header) by using a program.

In the following, in the digital multi-function peripheral 1 of Embodiment 1, the process of generating the output image data by adding the image data of the gradation QR code on the basis of the first data, second data and details data and the visible watermark information pattern data to the image data obtained by the image reading apparatus 200, is described in detail.

Figure 9:
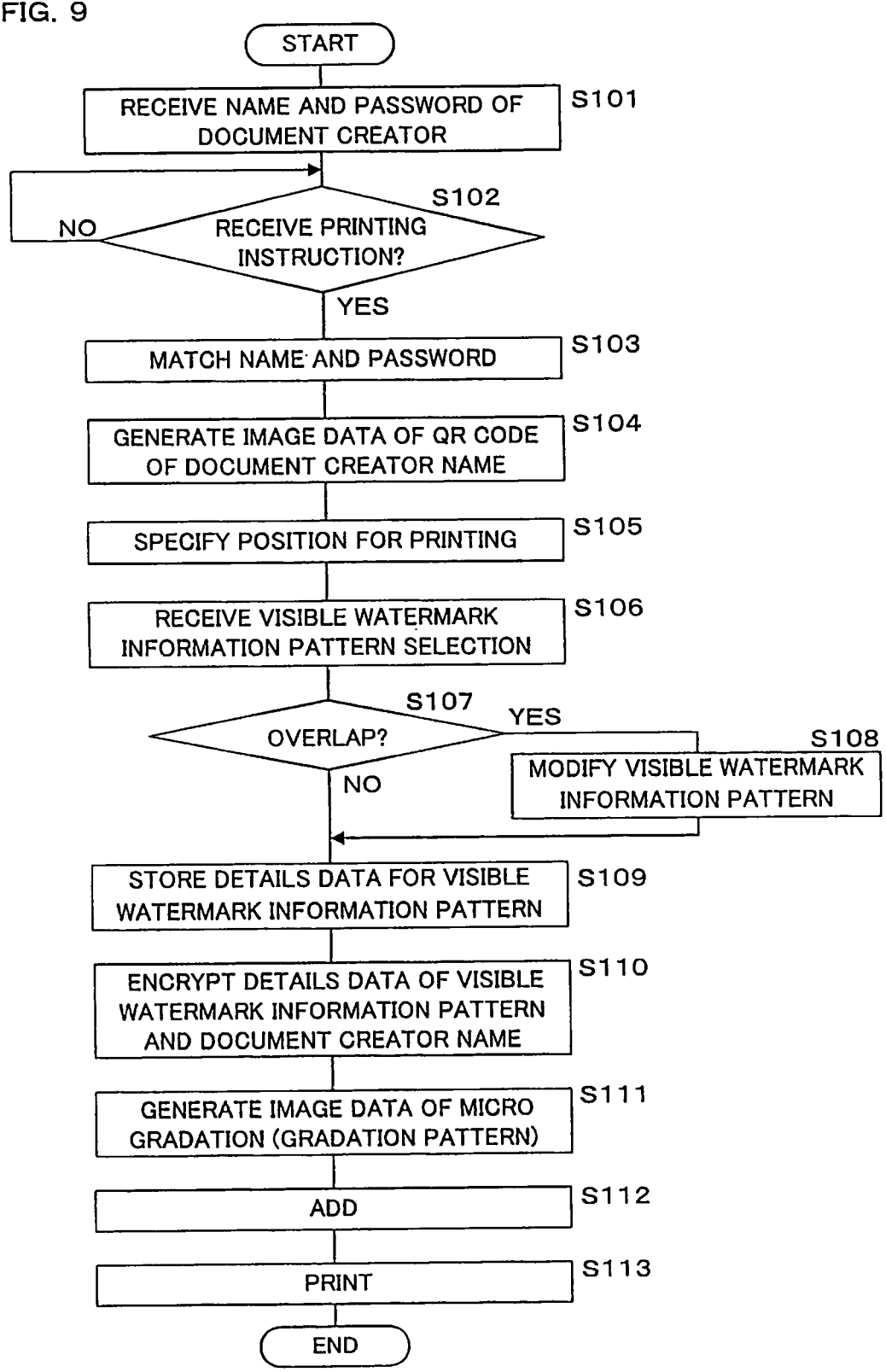
FIG. 9 is a flowchart of processing executed by the control unit when the digital multi-function peripheral creates a document by adding the image of the gradation QR code and visible watermark information pattern data to an image based on obtained image data in Embodiment 1.

FIG. 9 is a flowchart of processing executed by the control unit 100 when the digital multi-function peripheral 1 creates a document by adding the image of the gradation QR code and visible watermark information pattern data to an image based on obtained image data in Embodiment 1.

For convenience, it is assumed in the following description that the first data and the second data are both a name of a creator of a document. Furthermore, it is also assumed that the image data from a prescribed document is read by image reading apparatus 200, and an image on the basis of said image data is printed. It is not limited to this above mentioned. The description may be given on a case where the digital multi-function peripheral 1 of Embodiment 1 is connected to electric equipment such as a PC (Personal Computer) or a PDA (Personal Digital Assistance) having a function to edit and create image data so as to obtain image data from the electric equipment. Here, the storage unit 300 stores thumbnails for showing the visible watermark information patterns in FIG. 10A and FIG. 10B, and when a thumbnail is displayed in the display section 501, the selection of a visible watermark information pattern is received from the control panel 500. FIG. 10A is a diagram showing examples of thumbnails for visible watermark information patterns in the case where the visible watermark information of text is high resolution, and FIG. 10B is a diagram in the case of low resolution.

The creator of the document first inputs, before reading a desired document, his/her name and password by operating the control panel 500. Thus, the CPU 101 of the control unit 100 receives the name (first data) and the password of the document creator through the control panel 500 (Step S101). At this point, the description is given on a case where the creator of the document is one in number, and in the case where there are a plurality of creators of a document, names of the respective creators may be inputted. Alternatively, a number, a contact address or the like by which an individual can be specified may be inputted instead of the name. Alternatively, another material created by the creator of the document, a reference, update history of the document, a team member name or the like may be inputted.

Next, the creator of the document instructs the digital multi-function peripheral 1 to read a document. The CPU 101 receives the instruction to read the document through the control panel 500 and makes the image reading apparatus 200 read the document. Image data read by the image reading apparatus 200 is temporarily stored in the storage unit 300. After editing such as shrink, magnification, and rotation of the image data, for example, the creator of the document presses the "printing" button of the control panel 500 for printing an image (target image) based on the edited image data (obtained image data) on recording paper.

The CPU 101 determines whether or not a printing instruction has been received from the user by, for example, monitoring an operation of the "printing" button of the control panel 500 (Step S102). When it is determined that a printing instruction has not been received (Step S102: NO), the CPU 101 waits for reception of a printing instruction. On the other hand, when it is determined that a printing instruction has been received (Step S102: YES), the CPU 101 matches the name and the password of the document creator received in Step S101 on the basis of the data stored in the storage unit 300 (Step S103).

When the name and the password of the document creator accord with those stored in the storage unit 300, the CPU 101 generates image data of a QR code on the basis of the document creator name received in Step S101 (Step S104). This procedure is executed by the CPU 101 instructing the QR code generation section 401 of the code creation section 410 to generate image data of a QR code based on the document creator name.

On the other hand, when the name and the password of the document creator do not accord with those stored in the storage unit 300, the CPU 101 displays, on the display section 501, an input screen including a text that the name and the password of the document creator do not accord for urging to input the name and the password of the document creator again.

Next, the CPU 101 instructs the print position specification section 404 to specify a position for adding the gradation QR code which is generated in Step S104, on recording paper (Step S105). For example, in the digital multi-function peripheral 1 of Embodiment 1, the gradation QR code is printed at a right end of a header in accordance with a prescribed program. Thus, it is possible to generate image data for the temporary document image.

After that, the CPU 101 instructs the visible watermark information pattern receiving section 102 to receive the selection of a visible watermark information pattern (Step S106). In response to the instruction of the CPU 101, the visible watermark information pattern receiving section 102 reads out the thumbnail for a visible watermark information pattern stored in the storage unit 300 and displays it on the display section 501. The thumbnail is shown together with a text specifying number (see FIG. 10) and the document creator operates the control panel 500 and presses the number of the desired visible watermark information pattern. Accordingly, the visible watermark information pattern receiving section 102 can receive the selection of a visible watermark information pattern from the control panel 500.

Here, it is possible to select more than just one visible watermark information pattern. When multiple visible watermark information patterns are selected, a visible watermark information pattern where the visible watermark information of text of the selected visible watermark information patterns are arranged randomly may be generated, for example.

Next, the CPU 101 determines whether or not the temporary document image generated in Step S105 and the visible watermark information of text of the visible watermark information pattern received in Step S106 overlap (Step S107). The CPU 101 instructs the overlap detection section 103 to detect overlapping, and The determination is based on the results of the overlapping detection by the overlap detection section 103. The process of overlapping detection by the overlap detection section 103 is described above, and the details are not repeated.

When it is determined that the temporary document image and the visible watermark information pattern overlap (Step S107: YES), the visible watermark information pattern is modified so as to remove the visible watermark information of text in the overlapping portion (Step S108). The visible watermark information pattern data on which the process of modifying is carried out is temporarily stored in the RAM.

When it is determined that the temporary document image and the visible watermark information pattern do not overlap (Step S107: NO), or after the process of modifying the visible watermark information pattern in Step S108, the details data representing the detail information of the visible watermark information pattern is prepared and stored in the storage unit 300 (Step S109). In the case where the selection of multiple visible watermark information patterns is received in Step S106, for example, and a process of modifying the visible watermark information patterns is carried out in Step S108, the details data represents the text specifying numbers for visible watermark information of text included in the visible watermark information patterns after the modification and the position data for displaying each visible watermark information of text (coordinates).

Next, the CPU 101 instructs the encryption section 402 of the code creation section 410 to encrypt the details data and the name of the document creator (second data) (Step S110). In response to the instruction of the CPU 101, the encryption section 402 obtains a secret key corresponding to the name of the document creator (user) from the storage unit 300 and encrypts the details data and the name of the document creator by using the secret key.

Here, the document creator may input the secret key by using the control panel 500 at the time of preparing the document. In this case, a process of determining whether or not the inputted secret key matches the name and password of the document creator on the basis of the data stored in the storage unit 300 may need to be carried out.

After that, the CPU 101 generates image data of micro gradation (gradation pattern) on the basis of the details data and the name of the document creator encrypted by the encryption section 402 (encrypted data) (Step S111). This is achieved when the CPU 101 instructs the microgradation generation section 403 to generate image data of micro gradation on the basis of the encrypted data. The process of generating image data of micro gradation by the micro gradation generation section 403 is described above, and the details are not repeated. As a result of the above described process, micro gradation based on encrypted details data and the name of the document creator is shown in the QR code on the basis of the first data, and image data (additional image data) of the gradation QR code (additional image) is generated.

The CPU 101 (addition section) adds the image data of the gradation QR code to the image data for the target image, so that the gradation QR code is printed in the position specified in Step S105 (Step S112), reads the visible watermark information pattern selected and received in Step S106 or the visible watermark information pattern on which a modifying process is carried out in Step S108 from the storage unit 300, and adds it to the image data of the target image. As a result of the process, output image data is generated.

Figure 11:
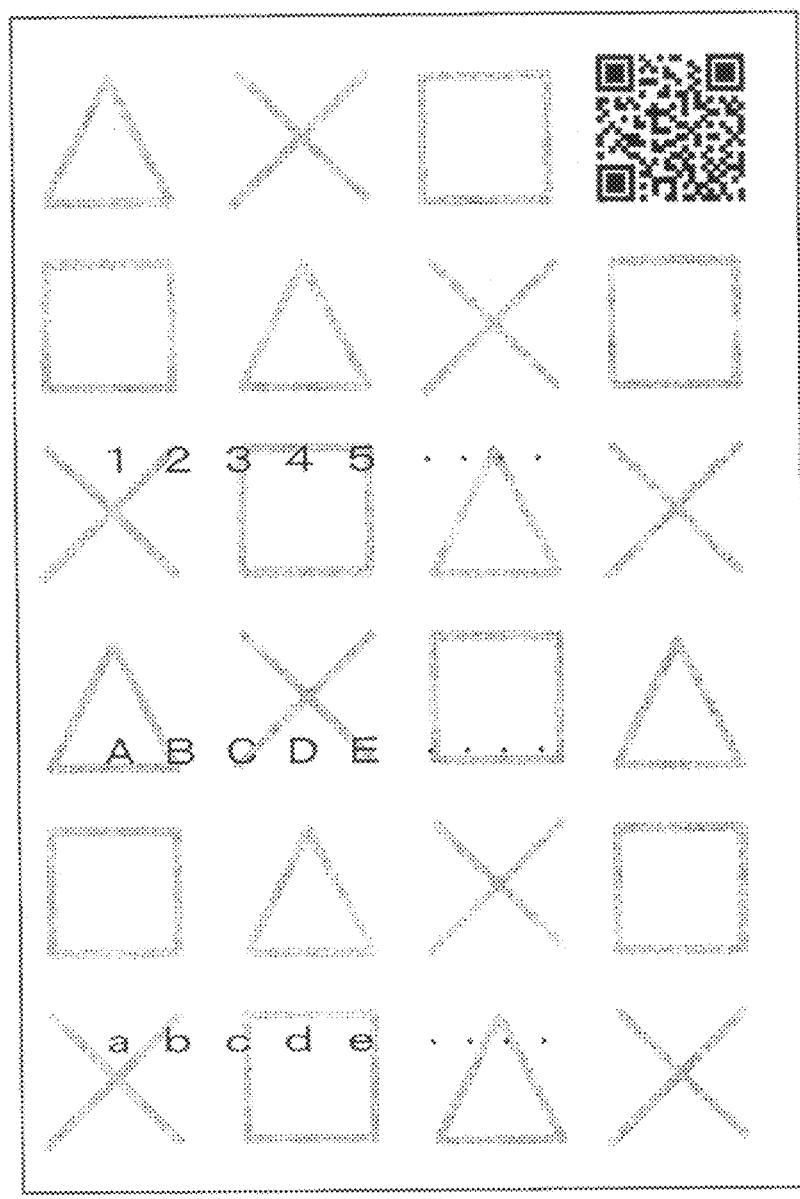
FIG. 11 is a diagram illustrating an example of the document printed by the image output apparatus.

Next, the CPU 101 instructs the image output apparatus 700 to print an image on recording paper on the basis of the out put image data (Step S113). In response to the instruction of the CPU 101, the image output apparatus 700 prints an image on the basis of the out put image data. A gradation QR is printed on the document prepared by the image output apparatus 700 at the right end of the header on the basis of the second data and details data. FIG. 11 is a diagram illustrating an example of the document printed by the image output apparatus 700.

Thus, the gradation QR code and the visible watermark information pattern are attached to the document, so that the security can be enhanced, by verifying whether the specific image of the document and the details data and/or the first data and second data correspond during a later process. And illegal falsification of the document by cutting out the gradation QR code portion from a document and pasting it on another document can be prevented. The details are described in the Embodiment 2.

Second Embodiment

FIG. 12 is a block diagram illustrating a principal configuration of the digital multi-function peripheral 1 of Embodiment 2 of the present invention. Like the digital multi-function peripheral 1 of Embodiment 1, the digital multi-function peripheral 1 of Embodiment 2 includes hardware, such as a control unit 100, an image reading apparatus 200, an image processing apparatus 400, an image output apparatus 700, a storage unit 300, a communication unit 600 and an control panel 500, and forms a digital multi-function peripheral as a whole.

Here, the digital multi-function peripheral 1 of Embodiment 2 is different from the digital multi-function peripheral 1 of Embodiment 1 in that the control unit 100 includes a visible watermark information pattern matching section 104 and the image processing apparatus 400 includes a document authentication section 420, in addition to a code creation section 410.

Figure 13:
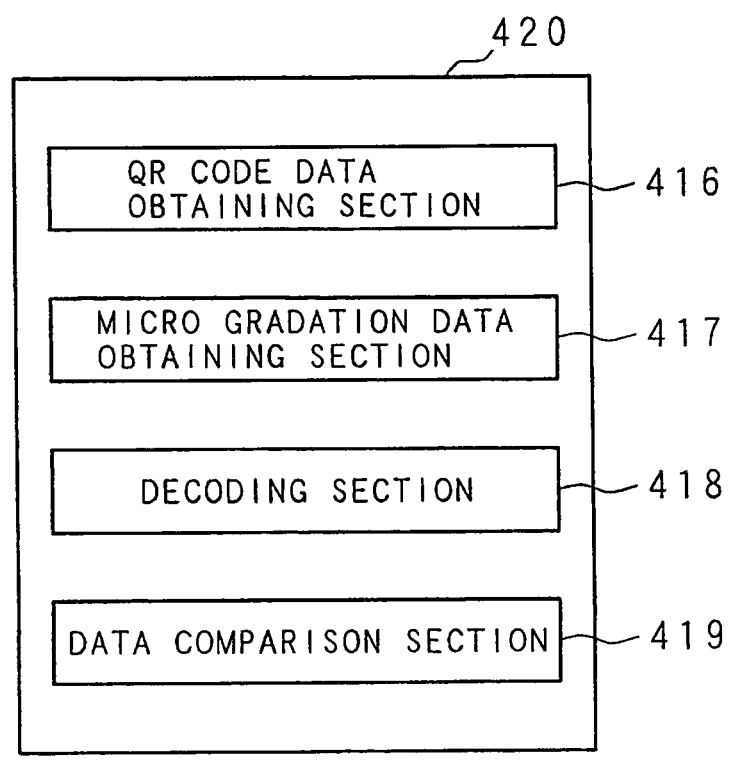
FIG. 13 is a functional block diagram illustrating a principal configuration of the document authentication section included in the image processing apparatus of the digital multi-function peripheral of Embodiment 2.

FIG. 13 is a functional block diagram illustrating a principal configuration of the document authentication section 420 included in the image processing apparatus 400 of the digital multi-function peripheral 1 of Embodiment 2. The document authentication section 420 includes a QR code data obtaining section 416 (separation section), a micro gradation data obtaining section 417 (separation section), a decoding section 418 and a data comparison section 419 (matching section).

The QR code data obtaining section 416 extracts (separates), for example, from image data of a QR code included in image data of a document read by the image reading apparatus 200, first data expressed with a QR code (hereinafter referred to as the QR code data). The QR code data obtaining section 416 specifies the position of the QR code on the basis of cut-out symbols of the QR code, and extracts and obtains the QR code data.

The micro gradation data obtaining section 417 extracts the encrypted data; that is to say, the second data encrypted, and the details data of the image data of the document from the image data of the gradation QR code obtained from the image data of the document read by the image reading apparatus 200, for example.

The decoding section 418 decodes the encrypted data obtained by the micro gradation data obtaining section 417 by using a public key (or decoding key).

The data comparison section 419 compares (matches), for example, first data and second data with each other. The first data corresponds to the QR code data obtained by the QR code data obtaining section 416. The second data corresponds to data obtained by decoding, by the decoding section 418, the encrypted second data obtained by the micro gradation data obtaining section 417.

In addition, the visible watermark information pattern matching section 104 of the control unit 100 matches, for example, the visible watermark information pattern of the image data of the document read by the image reading apparatus 200 and the details data extracted by the micro gradation data obtaining section 417 and decoded by the decoding section 418, and determines whether or not accord with each other.

The details data has a text specifying number for specifying visible watermark information of text that does not overlap with the target image of the document, and the coordinates of the display position of the visible watermark information of text corresponding to the text specifying number. Therefore, the visible watermark information pattern matching section 104 matches the visible watermark information pattern of the image data of the document and the details data on the basis of the details data, and determines whether or not the visible watermark information pattern of the image data of the document correspond to the details data.

In addition, the read text specifying data specifying visible watermark information of text in the case where the visible watermark information pattern of the document is read by the image reading apparatus 200 is stored in the storage unit 300 of the digital multi-function peripheral 1 of Embodiment 2 together with the matching text specifying number. That is to say, the image reading apparatus 200 can read only low resolution images, and therefore, the read text specifying data corresponds to the visible watermark information pattern before it is read by the image reading apparatus 200 with the high resolution portions removed.

In the following, the process for a case where the digital multi-function peripheral 1 of Embodiment 2 handles the document (image data) printed by the digital multi-function peripheral 1 of Embodiment 1 to which the gradation QR code and visible watermark information pattern are added is described. For convenience, it is assumed in the following description that a user copies a document printed by the digital multi-function peripheral 1 of Embodiment 1.

Furthermore, in the gradation QR code added to the document, QR code data is data corresponding to a document creator name (first data), and the name of the document creator (second data) and the details data are generated in the cell of the QR code as micro gradation. Incidentally, the storage unit 300 stores, in the same manner as in Embodiment 1, data in which a user name, a password of each user, a public key of each user are associated with one another.

Figure 14:
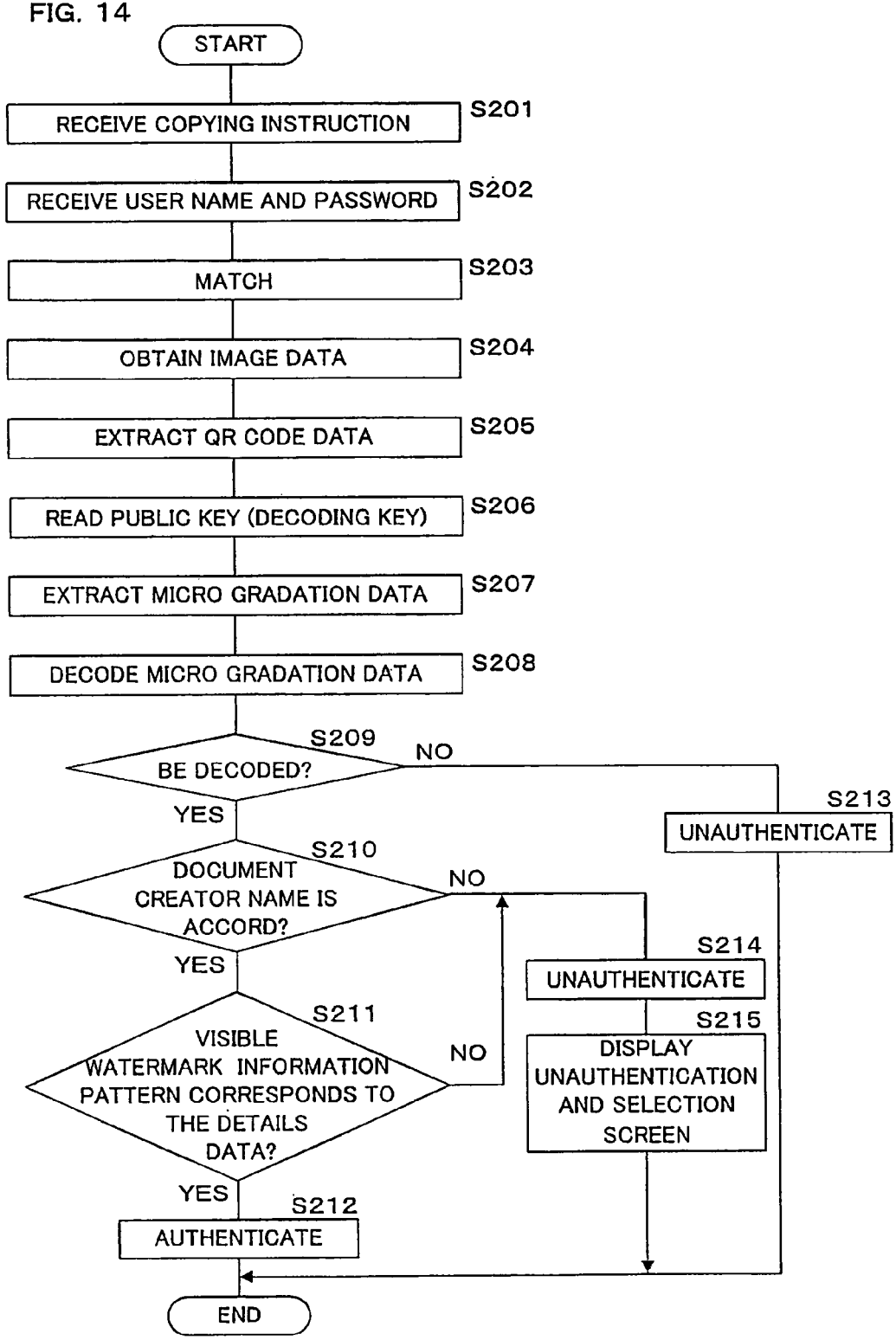
FIG. 14 is a flowchart of copying of a document to which the gradation QR code and visible watermark information pattern are added, by the digital multi-function peripheral of Embodiment 2 of the present invention.

FIG. 14 is a flowchart of copying of a document to which the gradation QR code and visible watermark information pattern are added, by the digital multi-function peripheral 1 of Embodiment 2 of the present invention.

A user desiring to copy the document to which the gradation QR code and visible watermark information pattern are added places the document on a scanner platen and instructs copying of the document by operating the control panel 500.

The CPU 101 of the control unit 100 receives the copying instruction from the user through the control panel 500 (Step S201). When the instruction is received from the user, the CPU 101 displays, on the display section 501, an input screen for urging to input a user name and a password by using a program stored in the storage unit 300. When the user inputs the user name and the password by operating the control panel 500, the CPU 101 receives the user name and the password through the control panel 500 (Step S202).

When the user name and the password are received, the CPU 101 matches the user name and the password on the basis of data precedently stored in the storage unit 300 (Step S203). When the user name and the password accord with the stored data, the CPU 101 instructs the image reading apparatus 200 to read an image of the document so as to obtain image data of the document (Step S204).

On the other hand, when the user name and the password do not accord with the stored data, the CPU 101 displays, on the display section 501, a text that the user name and the password do not accord and an input screen for urging to input the user name and the password again.

Next, the CPU 101 instructs the QR code data obtaining section 416 to extract (separate) QR code data from the image data of the document (Step S205). In response to the instruction of the CPU 101, the QR code data obtaining section 416 specifies a position where the QR code is printed on the basis of cutout symbols of the QR code, so as to extract the QR code data from the image data of the document. Through this procedure, it is possible to obtain a document creator name (first data).

Thereafter, the CPU 101 reads a public key (a decoding key) to be used for decoding encrypted data from data stored in the storage unit 300 on the basis of the document creator name (or password) received in Step S202 (Step S206). The method for obtaining the public key is not limited to this method but the public key may be obtained by receiving it from the user through the control panel 500. The obtained public key is temporarily stored in the RAM of the control unit 100.

Next, the CPU 101 instructs the micro gradation data obtaining section 417 to extract (separate) micro gradation data generated in the cell of the QR code as micro gradation by specifying a position of the QR code on the basis of cutout symbols of the QR code (Step S207). In response to the instruction of the CPU 101, the micro gradation data obtaining section 417 extracts the micro gradation data of the QR code; that is to say, encrypted data, and can obtain the second encrypted data and details data, which are the encrypted data.

The CPU 101 instructs the decoding section 418 to decode the micro gradation data extracted in Step S207; that is to say, the encrypted data (Step S208). In response to the instruction of the CPU 101, the decoding section 418 reads the public key stored in the RAM of the control unit 100 and decodes the encrypted data by using the public key.

Next, the CPU 101 determines whether or not the encrypted data is decoded by the decoding section 418 (Step S209). When it is determined that the encrypted data is not decoded by the decoding section 418 (Step S209: NO), the CPU 101 unauthenticates the document (image data) as an unreliable document (Step S213).

On the other hand, when it is determined that the encrypted data is decoded by the decoding section 418 (Step S209: YES), the CPU 101 instructs the data comparison section 419 to compare the second data decoded by the decoding section 418 with the QR code data (first data) obtained in Step S205. Incidentally, the CPU 101 determines whether or not the second data and the QR code data (first data) accord with each other in accordance with the comparison result obtained by the data comparison section 419. That is to say, in the present embodiment, the first data and the second data are both the name of the document creator, and therefore, the CPU 101 determines whether or not the name of the document creator matches (Step S210).

When it is determined that the second data and the QR code data do not accord with each other; that is to say, when it is determined that the name of the document creator does not match (Step S210: NO), the CPU 101 unauthenticates the document (image data) as an unreliable document (Step S214). In this case, the CPU 101 displays the result of the determination saying the document is unreliable and a selection screen for receiving selection whether or not the processing is to be continued on the display section 501 of the control panel 500 (Step S215).

Thereafter, the CPU 101 may cancel the copying instruction received in Step S201, discard the image data, inform the creator of the document including the QR code through the communication unit 600, or the like. In this manner, damage such as forgery of a document by a malicious third party can be prevented.

When it is determined that the second data and the QR code data accord with each other; that is to say, when it is determined that the name of the document creator matches (Step S210: YES), the CPU 101 (determination section) determines whether or not the detail information of the visible watermark information pattern in the image data of the document read in Step S204 corresponds to the details data decoded in Step S208 (Step S211). Because the visible watermark information of text included in the visible watermark information pattern of the image data of the document read in Step S204 which does not overlap with the target image in the document and the coordinates of said visible watermark information of text can be specified on the basis of the read text specifying data stored in the storage unit 300, for example, the visible watermark information of text and its coordinates are matched with the details data decoded in Step S208 in the determination.

When it is determined that the detail information of the visible watermark information pattern of the image data of the document do not match the details data (Step S211: NO), the CPU 101 moves the process to Step S214 and Step 215 in sequence. Meanwhile, when it is determined that the detail information of the visible watermark information pattern in the image data of the document match the details data (Step S211: YES), the CPU 101 determines that the document (image data) is reliable and authorizes it (Step S212), and then processes (copies) the image data of the document.

This structure for matching the visible watermark information pattern can prevent illegal falsification of a document where a person with malicious intent cuts and separates the gradation QR code for the document (document) from the rest of the recording paper and pastes it on another document.

Like reference numerals are used to refer to like elements used in Embodiment 1 so as to omit the detailed description.

Third Embodiment

Processes on the document to which the gradation QR code and the visible watermark information pattern are attached which the document creator does not desire are limited in the Embodiment 3, and this is described below.

The digital multi-function peripheral 1 of Embodiment 3 has the same structure as the image forming apparatus of Embodiment 1 and Embodiment 2, but is characterized by the process in the encryption section 402 of the code creation section 410. In further detail, the encryption section 402 in the digital multi-function peripheral 1 of Embodiment 3 encrypts data for limiting use of the printed document (or image data of the document), in addition to the name of the document creator. In the case where the document creator wants to specify persons who are permitted/prohibited use of the document, for example, the data for specifying them is encrypted by the encryption section 402. Thus, the micro gradation generation section 403 generates image data of micro gradation (gradation pattern) on the basis of the data for specifying the persons which is encrypted by the encryption section 402. In the following, an example of a case where the encryption section 402 encrypts the data (name or ID code, for example) for specifying persons who are permitted to copy the document (hereinafter referred to as authorized persons) is described in order to make the description easy.

Figure 15:
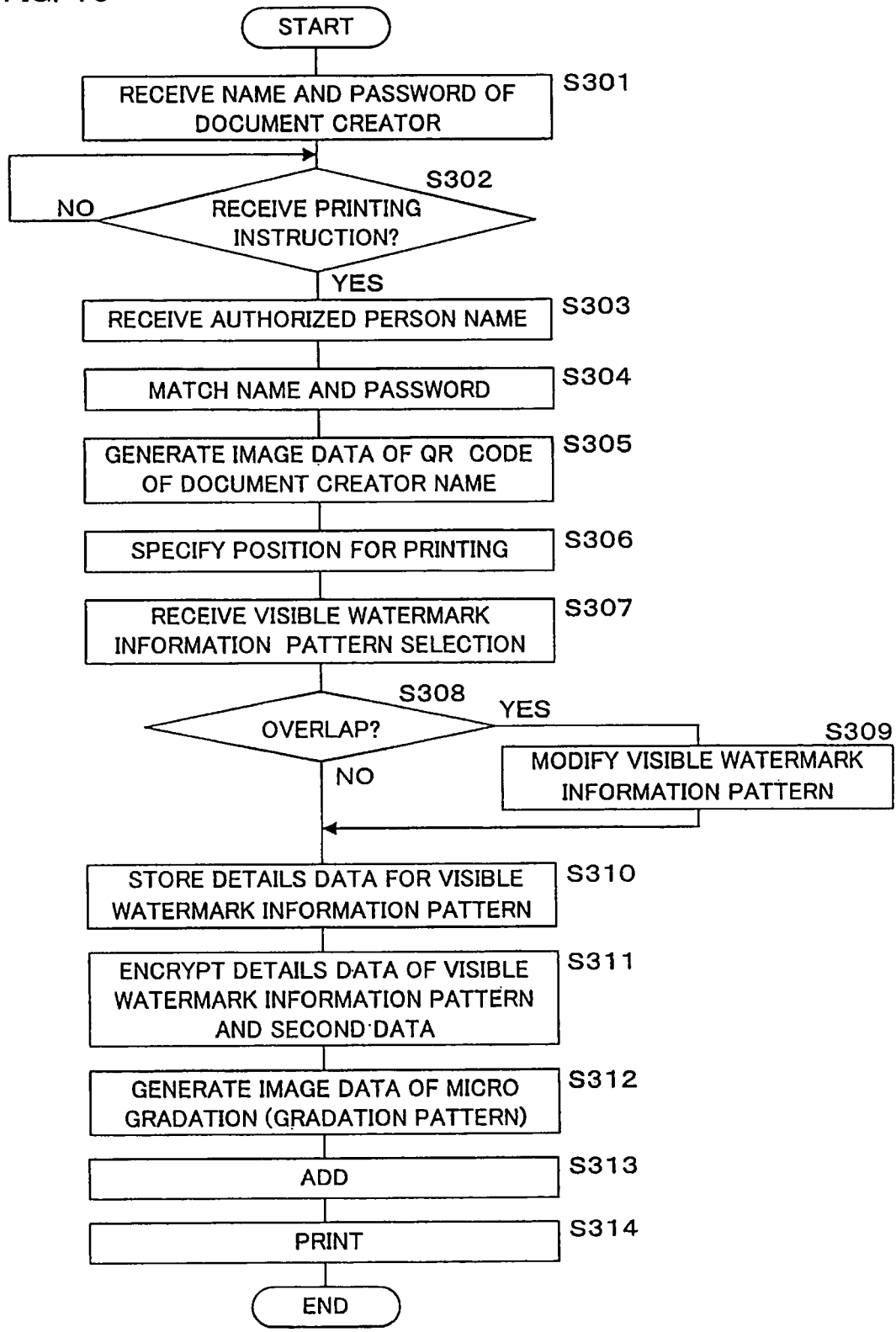
FIG. 15 is a flowchart of processing executed by the control unit when the digital multi-function peripheral creates a document by adding the image of the gradation QR code of second data including the name of the authorized persons and visible watermark information pattern data to an image based on obtained image data in Embodiment 3.

FIG. 15 is a flowchart of processing executed by the control unit 100 when the digital multi-function peripheral 1 creates a document by adding the image of the gradation QR code of second data including the name of the authorized persons and visible watermark information pattern data to an image based on obtained image data in Embodiment 3.

The creator of the document first inputs, before reading a document, his/her name and password by operating the control panel 500. Thus, the CPU 101 of the control unit 100 receives the name (first data) and the password of the document creator through the control panel 500 (Step S301).

Next, the CPU 101 receives the instruction to read the document through the control panel 500 and makes the image reading apparatus 200 read the document. Image data read by the image reading apparatus 200 is temporarily stored in the storage unit 300. After editing such as shrink, magnification, and rotation of the image data, for example, the creator of the document presses the "printing" button of the control panel 500 for printing an image (target image) based on the edited image data (obtained image data) on recording paper.

The CPU 101 determines whether or not a printing instruction has been received from the user by, for example, monitoring an operation of the "printing" button of the control panel 500 (Step S302). When it is determined that a printing instruction has not been received (Step S302: NO), the CPU 101 waits for reception of a printing instruction. On the other hand, when it is determined that a printing instruction has been received (Step S302: YES), the CPU 101 displays a screen for facilitating input of the name of the authorized person on the display section 501, for example. The document creator operates the control panel 500 so as to input the name of the authorized person. As a result, the CPU 101 receives the name of the authorized person from the control panel 500 (Step S303).

Next, the CPU 101 matches the name and the password of the document creator received in Step S301 on the basis of the data stored in the storage unit 300 (Step S304).

When the name and the password of the document creator accord with those stored in the storage unit 300, the CPU 101 generates image data of a QR code on the basis of the document creator name received in Step S301, by instructing the QR code generation section 401 of the code creation section 410 to generate image data of a QR code based on the document creator name (Step S305).

Next, the CPU 101 instructs the print position specification section 404 to specify a position for adding the gradation QR code which is generated in Step S305, on recording paper (Step S306). Thus, it is possible to generate image data for the temporary document image.

After that, the CPU 101 receives the selection of a visible watermark information pattern by instructing the visible watermark information pattern receiving section 102 to receive the selection of a visible watermark information pattern (Step S307).

Next, the CPU 101 instructs the overlap detection section 103 to detect overlapping, determines whether or not the temporary document image generated in Step S306 and the visible watermark information of text of the visible watermark information pattern received in Step S106 overlap, on the basis of the overlapping detection result by the overlap detection section 103 (Step S308)

When it is determined that the temporary document image and the visible watermark information pattern overlap (Step S308: YES), the visible watermark information pattern is modified so as to remove the visible watermark information of text in the overlapping portion (Step S309).

When it is determined that the temporary document image and the visible watermark information pattern do not overlap (Step S308: NO), or after the process of modifying the visible watermark information pattern in Step S309, the details data of said visible watermark information pattern is prepared and stored in the storage unit 300 (Step S310).

Next, the CPU 101 encrypts the details data and the second data including the name of the document creator and the name of the authorized person, by instructing the encryption section 402 of the code creation section 410 (Step S311). In response to the instruction of the CPU 101, the encryption section 402 encrypts the details data and the second data by using the public key for each authorized person corresponding to the name of the authorized person.

After that, the CPU 101 generates image data of micro gradation (gradation pattern) on the basis of the details data and the second data encrypted by the encryption section 402 (Step S312). This is achieved when the CPU 101 instructs the micro gradation generation section 403 to generate image data of micro gradation on the basis of the encrypted data. As a result of the above described process, micro gradation based on encrypted details data and the second data is shown in the QR code on the basis of the first data, and image data (additional image data) of the gradation QR code (additional image) is generated.

The CPU 101 (addition section) adds the image data of the gradation QR code to the image data for the target image, so that the gradation QR code is printed in the position specified in Step S105 (Step S313), reads the visible watermark information pattern selected and received in Step S307 or the visible watermark information pattern on which a modifying process is carried out in Step S309 from the storage unit 300, and adds it to the image data of the target image. As a result of the process, output image data is generated.

Next, the CPU 101 instructs the image output apparatus 700 to print the image on recording paper on the basis of the out put image data (Step S314).

As a result of the process, the micro gradation for the data specifying the authorized person is shown in a cell of the QR code on the basis of the name of the document creator, on the document printed by the digital multi-function peripheral 1 of Embodiment 3. Documents printed by the digital multi-function peripheral 1 of Embodiment 3, which need authorization to be copied, as described above, are hereinafter referred to as copying authorization-required documents.

Meanwhile, in the case where the digital multi-function peripheral 1 of Embodiment 3 processes (copies, for example) the image data for a copying authorization-required document that is printed as described above, the copying authorization-required document is copied on the basis of the micro gradation data showing the authorized person.

Figure 16:
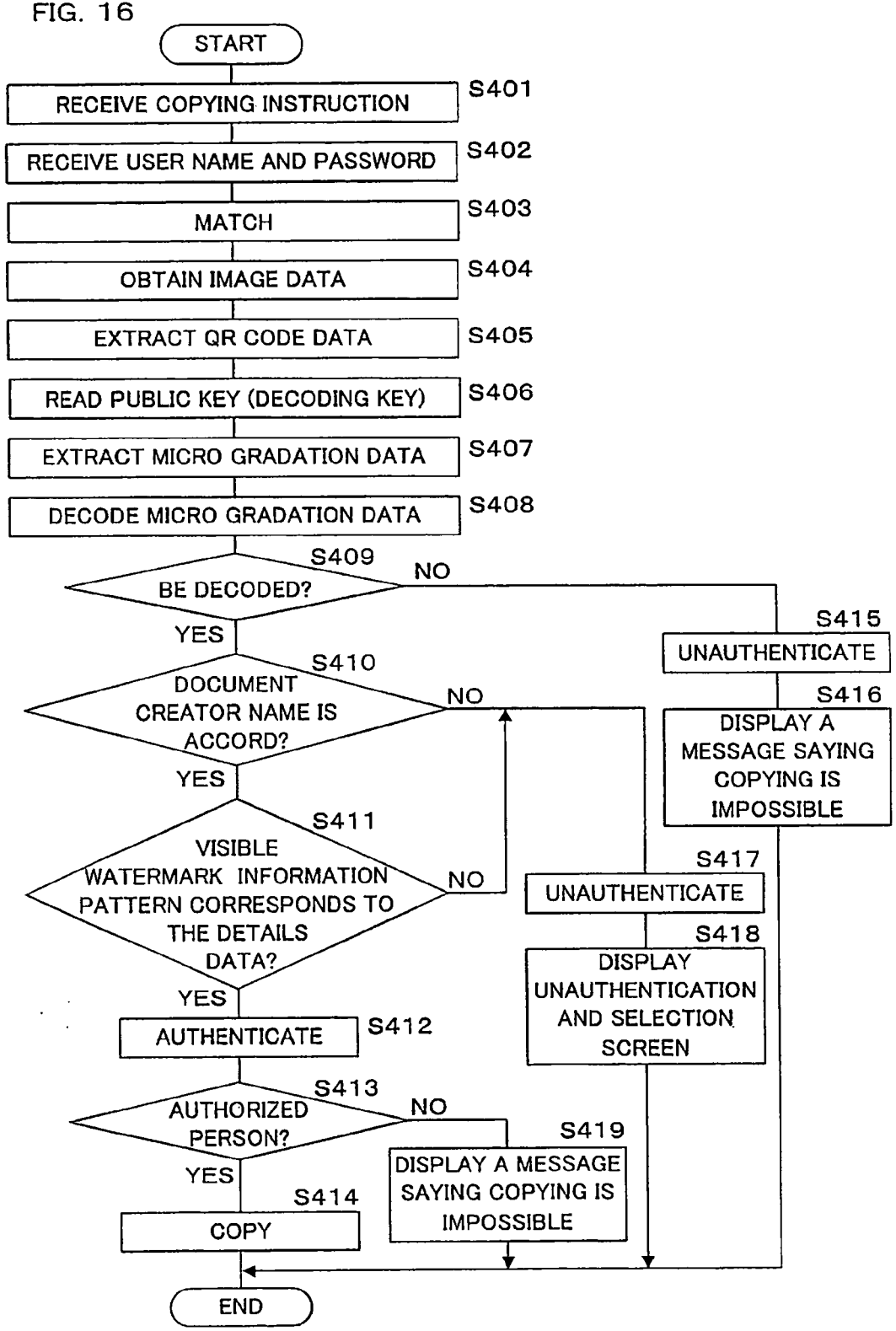
FIG. 16 is a flow chart showing the process of copying an above described copying authorization-required document in the digital multi-function peripheral of Embodiment 3 of the present invention.

In the following, a case where an above described copying authorization-required document is copied is described as an example of a process for image data of the copying authorization-required document in the digital multi-function peripheral 1 of Embodiment 3 of the present invention. FIG. 16 is a flow chart showing the process of copying an above described copying authorization-required document in the digital multi-function peripheral 1 of Embodiment 3 of the present invention. An example of a case where a predetermined person copies an above described copying authorization-required document is described in order to make the description easier. Micro gradation for the name of the document creator and authorized persons (second data), as well as details data, is shown in a cell of the QR code on the basis of the name of the document creator (first data) in the copying authorization-required document, and the user name, password and secret key (and public key) for each user are stored together in the storage unit 300, as in Embodiment 1 and Embodiment 2.

The user who tries to copy a document which is a copying authorization-required document as described above places the document on the scanner platen and operates the control panel 500 so as to instruct the digital multi-function peripheral to copy the document.

The CPU 101 of the control unit 100 receives the copying instruction from the user through the control panel 500 (Step S401). When the instruction is received from the user, the CPU 101 displays, on the display section 501, an input screen for urging to input a user name and a password by using a program stored in the storage unit 300. When the user inputs the user name and the password by operating the control panel 500, the CPU 101 receives the user name and the password (third data) through the control panel 500 (third data receiving section) (Step S402).

When the user name and the password are received, the CPU 101 matches the user name and the password on the basis of data precedently stored in the storage unit 300 (Step S403). When the user name and the password accord with the stored data, the CPU 101 (obtaining section) instructs the image reading apparatus 200 to read an image of the document which is a copying authorization-required document so as to obtain image data of the document (Step S404).

Next, the CPU 101 instructs the QR code data obtaining section 416 to extract (separate) QR code data from the image data of the document (Step S405), and the QR code data obtaining section 416 specifies a position where the QR code is printed on the basis of cutout symbols of the QR code, so as to extract the QR code data from the image data of the document. Through this procedure, it is possible to obtain a document creator name (first data).

After that, the CPU 101 reads out the public key (decoding key) used when encrypted data is decoded, as described below, from the data stored in the storage unit 300 on the basis of the name of the user (or password) received in Step S402 (Step S406). The obtained public key is temporarily stored in the RAM of the control unit 100.

Next, the CPU 101 instructs the micro gradation data obtaining section 417 to specify the position of the QR code on the basis of the cutout symbol of the QR code and extracts (separates) micro gradation data generated in a cell of the QR code as micro gradation (Step S407). As a result, the encrypted second data and details data, which are encrypted data, can be obtained.

The CPU 101 instructs the decoding section 418 to decode the micro gradation data extracted in Step S407; that is to say, the encrypted data (Step S408). Following the instruction from the CPU 101, the decoding section 418 reads out the public key stored in the RAM of the control unit 100 and decodes the encrypted second data and details data using the public key.

Next, the CPU 101 determines whether or not decoding by the decoding section 418 was successful (Step S409). In the case where it is determined that the decoding by the decoding section 418 was not successful (Step S409:NO), the CPU 101 determines that the document (image data) is unreliable and does not authorize it (Step S415). In this case, the CPU 101 displays a message saying copying is impossible in the display section 501 on the control panel 500 (Step S416).

Meanwhile, in the case where it is determined that the decoding by the decoding section 418 was successful (Step S409:YES), the CPU 101 instructs the data comparison section 419 to compare the name of the document creator in the second data decoded by the decoding section 418 with the QR code data (first data) obtained in Step S405. That is to say, the first data is the name of the document creator in the present embodiment, and therefore, the CPU 101 determines whether or not the name of the document creator matches (Step S410).

In the case where it is determined that the name of the document creator does not match (Step S410:NO), the CPU 101 determines that the document (image data) is unreliable and does not authorize it (Step S417). In this case, the CPU 101 displays the results of the determination; that is to say, text that the document is unreliable and a screen for selecting whether or not to continue the process in the display section 501 on the control panel 500 (Step S418). Accordingly, damages caused by counterfeiting of the document by a person with malicious intent can be prevented, for example.

Meanwhile, in the case where it is determined that the name of the document creator matches (Step S410:YES), it is determined whether or not the detail information of the visible watermark information pattern in the image data of the document read in Step S404 correspond to the details data decoded in Step S408 (Step S411).

In the case where it is determined that the detail information of the visible watermark information pattern in the image data of the document do not correspond to the details data (Step S411:NO), the CPU 101 moves the process to Step S417 and S418 in sequence. Meanwhile, in the case where it is determined that the detail information of the visible watermark information pattern in the image data of the document correspond to the details data (Step S411:YES), the document (image data) is determined as reliable and authorized (Step S412).

Next, the CPU 101 instructs the data comparison section 419 to compare the name of the authorized person in the second data decoded by the decoding section 418 with the name of the user (third data) received in Step S402. The CPU 101 determines whether or not the name of the user (third data) is included in the name of the authorized person, which is the second data; that is to say, whether or not the user is an authorized person on the basis of the results of comparison by the data comparison section 419 (Step S413).

In the case where it is determined that the user is not an authorized person (Step S413:NO), the CPU 101 determines that the user is unreliable and displays a message saying copying is impossible in the display section 501 on the control panel 500 (Step S419).

Meanwhile, in the case where it is determined that the user name is that of an authorized person (Step S413:YES), the CPU 101 determines that the user is reliable and carries out the received copy instruction (Step S414).

This configuration for matching the visible watermark information pattern prevents illegal falsification of documents where a person with malicious intent cuts and separates the gradation QR code portion in the document (document) from the rest of the recording paper and pastes it on another document, and can prevent processes that are not envisioned by the document creator from being carried out, so that only specific users or specific processes are permitted.

Though an example of a case where the second data and the data received from the outside (third data) are matched and a process following the received instruction is carried out on the basis of the results of matching is described in the above, the invention is not limited to this. In the case where the name of the authorized person is QR coded as first data together with the name of the document creator, for example, it is possible for the received process to be carried out on the basis of the results of matching with the first data and the data received from an outside (third data).

Fourth Embodiment

Figure 17:
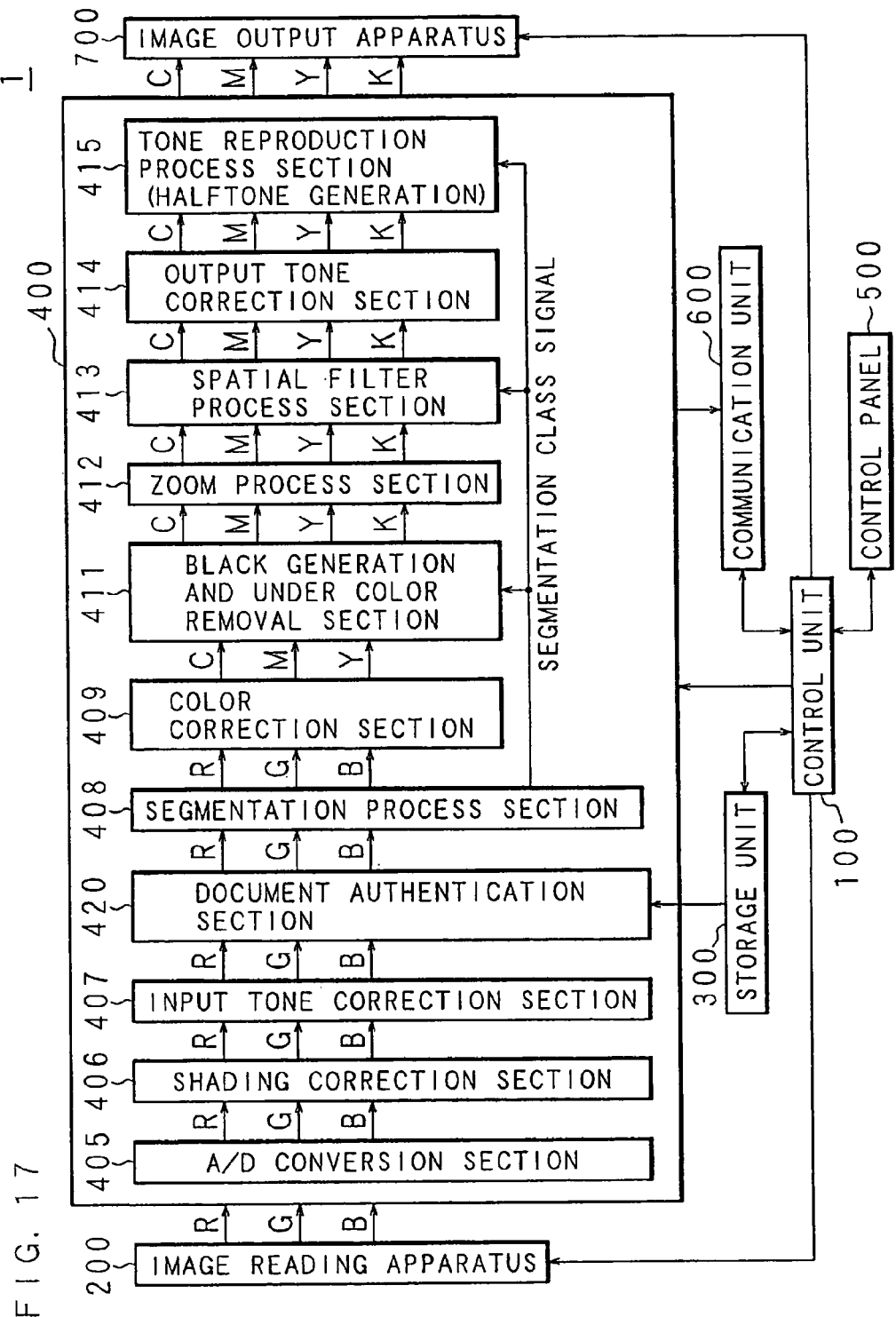
FIG. 17 is a functional block diagram illustrating a principal configuration of the digital multi-function peripheral of Embodiment 4 of the present invention.
Figure 18:
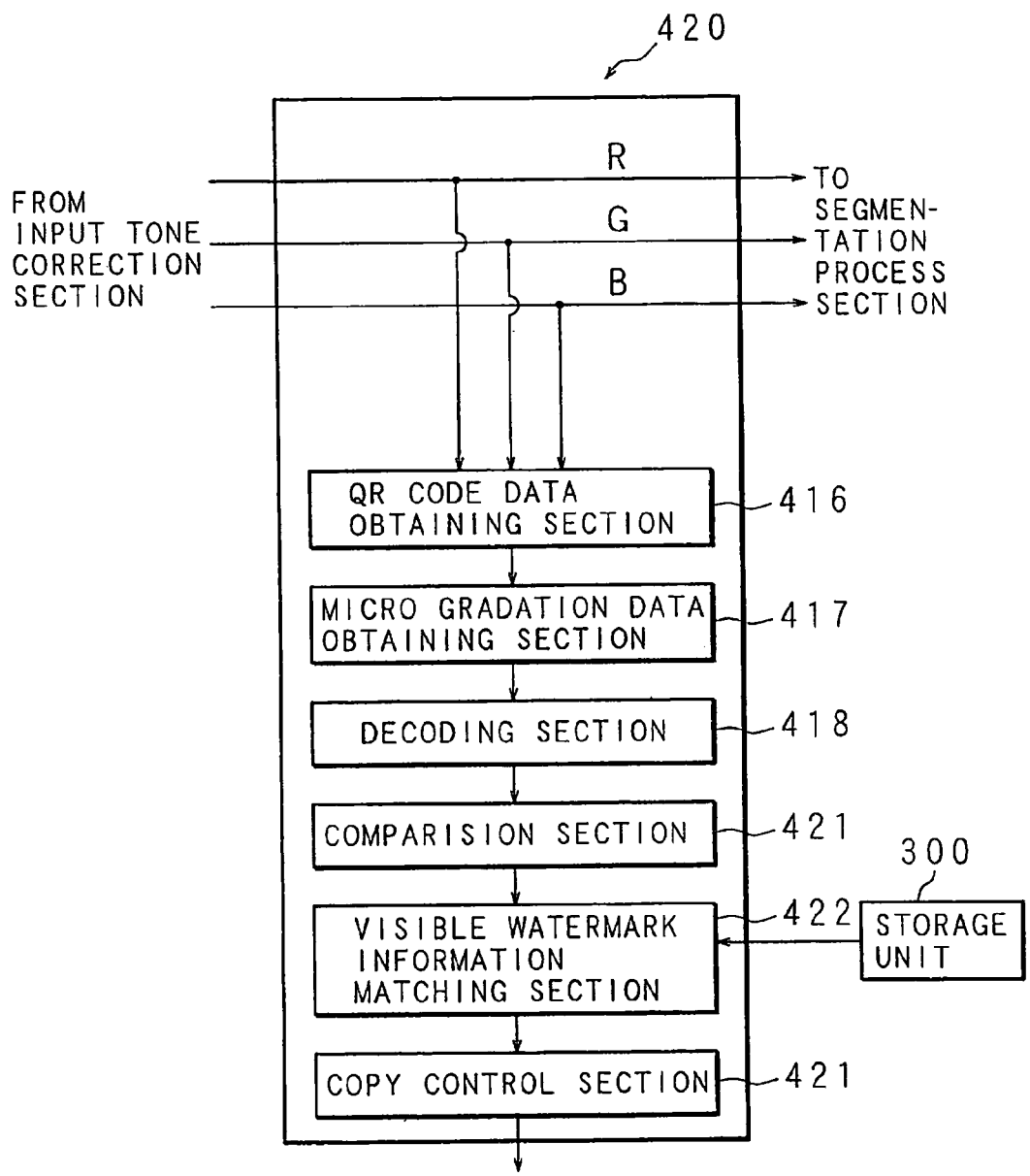
FIG. 18 is a functional block diagram illustrating a principal configuration of the document authorization section in the digital multi-function peripheral of Embodiment 4 of the present invention.

FIG. 17 is a functional block diagram illustrating a principal configuration of the digital multi-function peripheral 1 of Embodiment 4 of the present invention, and FIG. 18 is a functional block diagram illustrating a principal configuration of the document authentication section 420 in the digital multi-function peripheral 1 of Embodiment 4 of the present invention.

The digital multi-function peripheral 1 of Embodiment 4 includes, similarly to the image forming apparatus of Embodiment 2 or 3, hardware such as a control unit 100, an image reading apparatus 200, an image processing apparatus 400, an image output apparatus 700, a storage unit 300, a communication unit 600 and a control panel 500. The storage unit 300 stores, in the same manner as in Embodiment 2, data in which a user name, a password of each user, a public key of each user and the like are associated with one another. In addition, similarly to the storage unit 300 in the digital multi-function peripheral 1 of Embodiment 2, the read text specifying data, from which the high resolution portion is removed, is stored in the storage unit 300 in the digital multi-function peripheral 1 of Embodiment 4 of the present invention.

In addition, in the digital multi-function peripheral 1 of Embodiment 4 of the present invention, a gradation QR code including the second data and the details data of the visible watermark information pattern is attached to the image data read by the image reading apparatus 200, for example.

The image processing apparatus 400 includes an A/D (Analog/Digital) conversion section 405, a shading correction section 406, an input tone correction section 407, a document authentication section 420, a segmentation process section 408, a color correction section 409, a black generation and under color removal section 411, a zoom process section 412, a spatial filter process section 413, an output tone correction section 414, and a tone reproduction process section 415. Furthermore, the image processing apparatus 400 is connected to the image reading apparatus 200 and the image output apparatus 700.

Analog signals of image data read by the image reading apparatus 200 are transmitted, in the image processing apparatus 400, in the order of the A/D conversion section 405, the shading correction section 406, the input tone correction section 407, the document authentication section 420, the segmentation process section 408, the color correction section 409, the black generation and under color removal section 411, the zoom process section 412, the spatial filter process section 413, the output tone correction section 414 and the tone reproduction process section 415. Thereafter, the signals processed by the image processing apparatus 400 are outputted to the image output apparatus 700 as CMYK digital color signals.

The A/D conversion section 405 converts analog RGB signals received from the image reading apparatus 200 into digital RGB signals. The shading correction section 406 removes, from the digital RGB signals outputted from the A/D conversion section 405, various distortion caused during processing executed by the image reading apparatus 200 such as illumination system, image focusing system and image sensing system.

The input tone correction section 407 adjusts color balance of the RGB signals from which the various distortion has been removed by the shading correction section 406 (i.e., RGB reflectance signals) and converts the adjusted RGB signals into density signals.

Here, the document authentication section 420 in the digital multi-function peripheral 1 of Embodiment 4 includes a QR code data obtaining section 416, a micro gradation data obtaining section 417, a decoding section 418, a comparison section 421, a visible watermark information pattern matching section 422 and a copy control section 423.

The QR code data obtaining section 416 specifies the position of the gradation QR code on the basis of cut-out symbols of the gradation QR code, and obtains (extracts) QR code data from image data of the gradation QR code included in image data of a document read by the image reading apparatus 200.

The micro gradation data obtaining section 417 extracts encrypted data, that is to say, encrypted second data and details data in the image data of the document from the image data of the gradation QR code in the image data of the document read by the image reading apparatus 200, for example.

The decoding section 418 decodes the encrypted data obtained by the micro gradation data obtaining section 417 using a predetermined public key (or decoding key) (the public key may be stored in the storage unit 300 or may be formed so as to be inputted by the user through the control panel 500).

The comparison section 421, for example, compares (matches) the QR code data (first data) which is obtained by the QR code data obtaining section 416, with the second data which is obtained by the micro gradation data obtaining section 417 and decoded by the decoding section 418.

In addition, the visible watermark information pattern matching section 422 matches whether or not the visible watermark information pattern for the image data in the document read by the image reading apparatus 200 corresponds to the details data extracted by the micro gradation data obtaining section 417 and decoded by the decoding section 418, for example. In the case where the details data has a text specifying number showing a visible watermark information of text and coordinates showing the display position of the visible watermark information of text for the text specifying number, for example, the visible watermark information pattern matching section 422 matches whether or not the visible watermark information pattern for the image data of the document corresponds to the details data.

The copy control section 423 in the document authentication section 420 determines whether or not copying is possible, for example, on the basis of whether or not decoding is possible in the decoding section 418, the results of comparison by the comparison section 421 and/or the results of matching by the visible watermark information pattern matching section 422. In addition, the invention is not limited to this, and in the case where the second data includes the name of the authorized person as in the Embodiment 3, the name of the user is received from the control panel 500, and whether or not copying is possible is determined on the basis of the results of matching of the name of the user and the name of the authorized person.

The segmentation process section 408 receives the RGB signals and separates respective pixels of the inputted image into a text region, a halftone region and a photograph region. Also, the segmentation process section 408 outputs, in accordance with the result of the separation, a segmentation class signal representing which region each pixel corresponds to the black generation and under color removal section 411, the spatial filter process section 413 and the tone reproduction process section 415.

The color correction section 409 removes color impurity, for reproducing colors with fidelity, on the basis of the spectral characteristics of color materials of CMY (C: cyan, M: magenta and Y: yellow) including unnecessary absorbed components.

The black generation and under color removal section 411 generates black (K) signals on the basis of signals of the three colors of CMY resulting from the color correction and generates new CMY signals by subtracting the K signals from the original CMY signals. Thus, the CMY three-color signals are converted into CMYK four-color signals.

An example of a method for generating a black (K) signal is a black (K) signal generation method using skeleton black (a general method). In this method, assuming that the input/output characteristic of a skeleton curve is y=f(x), that inputted data are C, M and Y, that outputted data are C', M', Y' and K', and that a UCR (Under Color Removal) ratio is α (0<α<1), a black generation and under color removal process is expressed by the following expressions: K'=f{min(C, M, Y)}, C'=C−αK', M'=M−αK' and Y'=Y−αK'.

The zoom process section 412 executes scaling or the like of the image on the basis of a signal inputted by operating the control panel 500 included in the image forming apparatus.

The spatial filter process section 413 executes a spatial filtering process using a digital filter on the image data of the CMYK signals inputted from the black generation and under color removal section 411 in accordance with the segmentation class signals. The spatial filter process section 413 prevents blur and graininess degradation of an output image by correcting a spatial frequency characteristic. Also the tone reproduction process section 415 executes a prescribed process on the image data of the CMYK signals in accordance with the segmentation class signals similarly to the spatial filter process section 413.

For example, in a region separated as a text region by the segmentation process section 408, a high frequency component is sharpened through an edge enhancement process executed in the spatial filtering process of the spatial filter process section 413 so as to improve the reproducibility of a color text and a black text in particular. Simultaneously, the tone reproduction process section 415 selects a binarizing process or a multi-level dithering process suitable to reproduction of a high frequency in a screen with high resolution and executes the selected process.

Alternatively, in a region separated as a halftone region by the segmentation process section 408, the spatial filter process section 413 executes a low-pass filtering process of removing an inputted halftone component.

Then, the output tone correction section 414 executes an output tone correction process on the basis of the output characteristic of a color image output apparatus. Thereafter, in the tone reproduction process section 415, the image is ultimately separated into pixels, and a tone reproduction process (halftone generation) is executed so as to reproduce the tone of each pixel. In a region separated as a photograph region by the segmentation process section 408, a binarizing or multi-level dithering process is executed in a screen suitable for tone reproducibility.

The image data having been subjected to the aforementioned processes is once stored in the storage unit 300 and is read at prescribed timing to be inputted to the image output apparatus 700. The image output apparatus 700 prints (forms) an image based on the image data on a recording medium (such as paper). Examples of a method for printing the image based on the image data are the electrophotographic method and the ink-jet method. The method for printing the image data is, however, not specified. It is noted that the aforementioned processes are executed by a CPU 101 (not shown).

Like reference numerals are used to refer to like elements used in Embodiment 1 or 2 so as to omit the detailed description.

Although a document is copied in the aforementioned exemplary case, the application of the digital multi-function peripheral 1 of Embodiment 4 is not limited to this. For example, the digital multi-function peripheral 1 of Embodiment 4 is applicable also when the digital multi-function peripheral 1 includes a facsimile transmitting function, a scan to e-mail function or the like and obtained image data of a document is to be sent/received to/from an external device.

For example, when the digital multi-function peripheral 1 includes a communication unit having a modem and a network card so as to send data by facsimile, a procedure with a destination for sending is executed by using the modem. When a state ready for sending the facsimile is attained, the digital multi-function peripheral 1 executes necessary processing such as conversion of the encoding format on image data of a document encoded in a prescribed format (i.e., image data read with a scanner), and successively transmits the image data having been processed to the destination through a communication line.

Furthermore, when the digital multi-function peripheral 1 receives image data, the CPU 101 executes a communication procedure for receiving image data from a sender. The image data received by the digital multi-function peripheral 1 is decoded by an encode/decode process section (not shown). A rotation process and a process of converting the resolution are executed on the decoded image data if necessary. Thereafter, output tone correction and tone reproduction are executed on the image data and the executed image data is outputted from the image output apparatus.

Fifth Embodiment

Though an example of a case where image data is outputted in such a form as being printed is described in the above, the invention can be applied in cases of facsimile transmission, image transmission such that image data is transmitted to (1) a designated address when attached to an e-mail (scan to e-mail), (2) a folder designated by the user (scan to ftp) and (3) a USB memory attached to an image forming apparatus (scan to usb), and displaying of image data in an image displaying apparatus (for example, a liquid crystal display).

Figure 19:
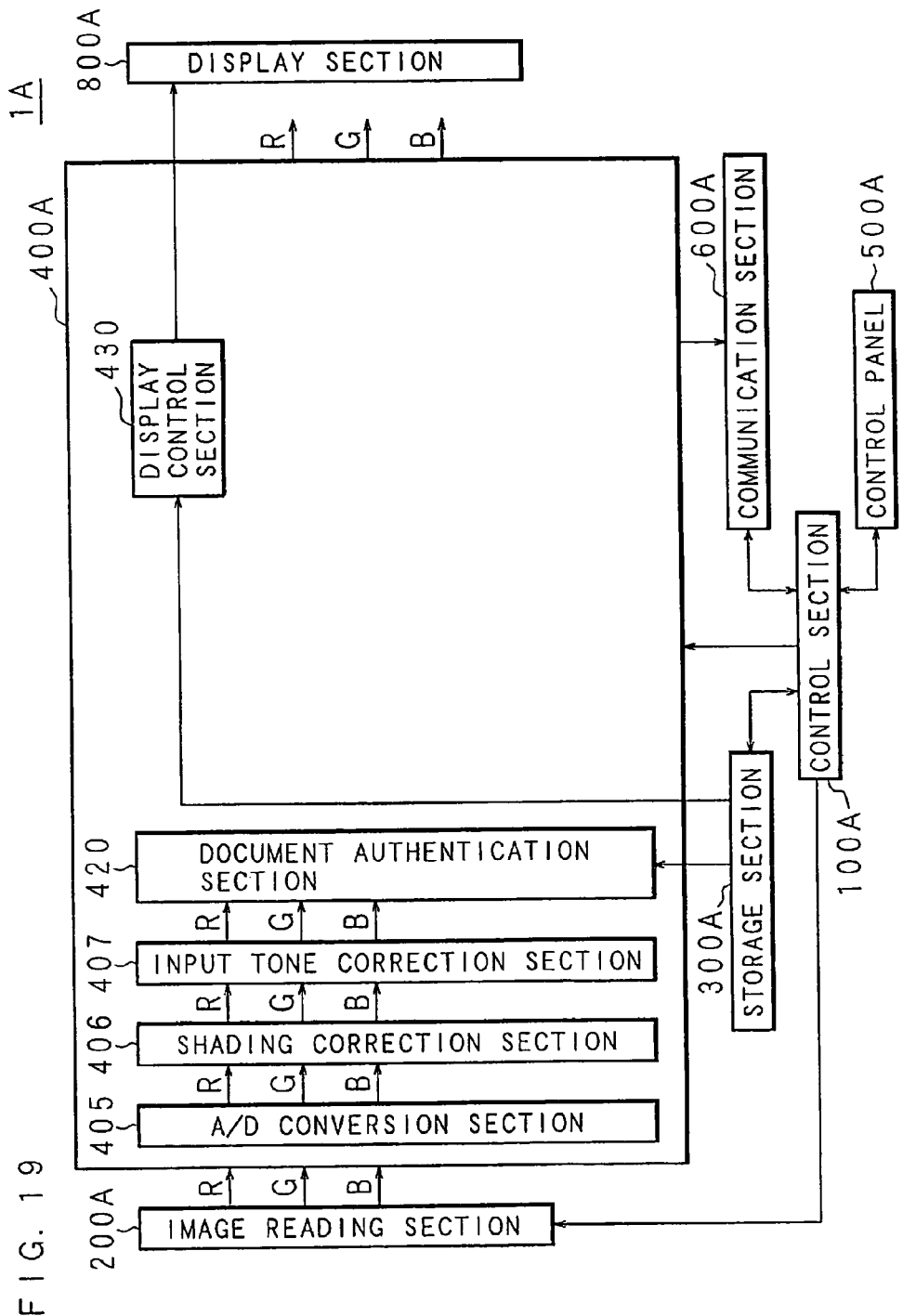
FIG. 19 is a functional block diagram illustrating a principal configuration of the image reading apparatus of Embodiment 5 of the present invention.

In addition, the present invention may be applied to an image reading apparatus, such as a scanner, instead of an image forming apparatus. FIG. 19 is a functional block diagram illustrating a principal configuration of the image reading apparatus of Embodiment 5 of the present invention. In the following, an example of a case where the image reading apparatus of Embodiment 5 of the present invention is a color image processing apparatus 1A is described.

The color image processing apparatus 1A of Embodiment 5 of the present invention includes hardware, such as a control section 100A, an image reading section 200A (reading section), an image process section 400A, a display section 800A, a storage section 300A, a communication section 600A and an control panel 500A, so as to form the color image processing apparatus 1A as a whole. The user name, password, public key and the like for each user are stored together in the storage section 300A as in the Embodiment 2. In addition, the read text specifying data, from which the high resolution portion is removed, is stored in the storage section 300A in the color image processing apparatus 1A of Embodiment 5 of the present invention as in the storage unit 300 of the digital multi-function peripheral 1 of Embodiment 2.

The image process section 400A in the color image processing apparatus 1A is formed of an A/D conversion section 405, a shading correction section 406, an input tone correction section 407, a document authentication section 420 and a display control section 430, and this is connected to an image reading section 200A so as to form the color image processing apparatus 1A as a whole. The processes in these process sections are the same as in the above, and therefore, the descriptions thereof are not repeated. The results of document authorization are outputted from the image process section 400A together with image data for RGB and transmitted to the connected computer, multipurpose machine, printer, server or the like from the communication section 600A. Here, the control section 100A controls the peripheral apparatuses, such as the computer, multipurpose machine, printer, server or the like, to recognize the results of document authorization and carry out a process.

Sixth Embodiment

Figure 20:
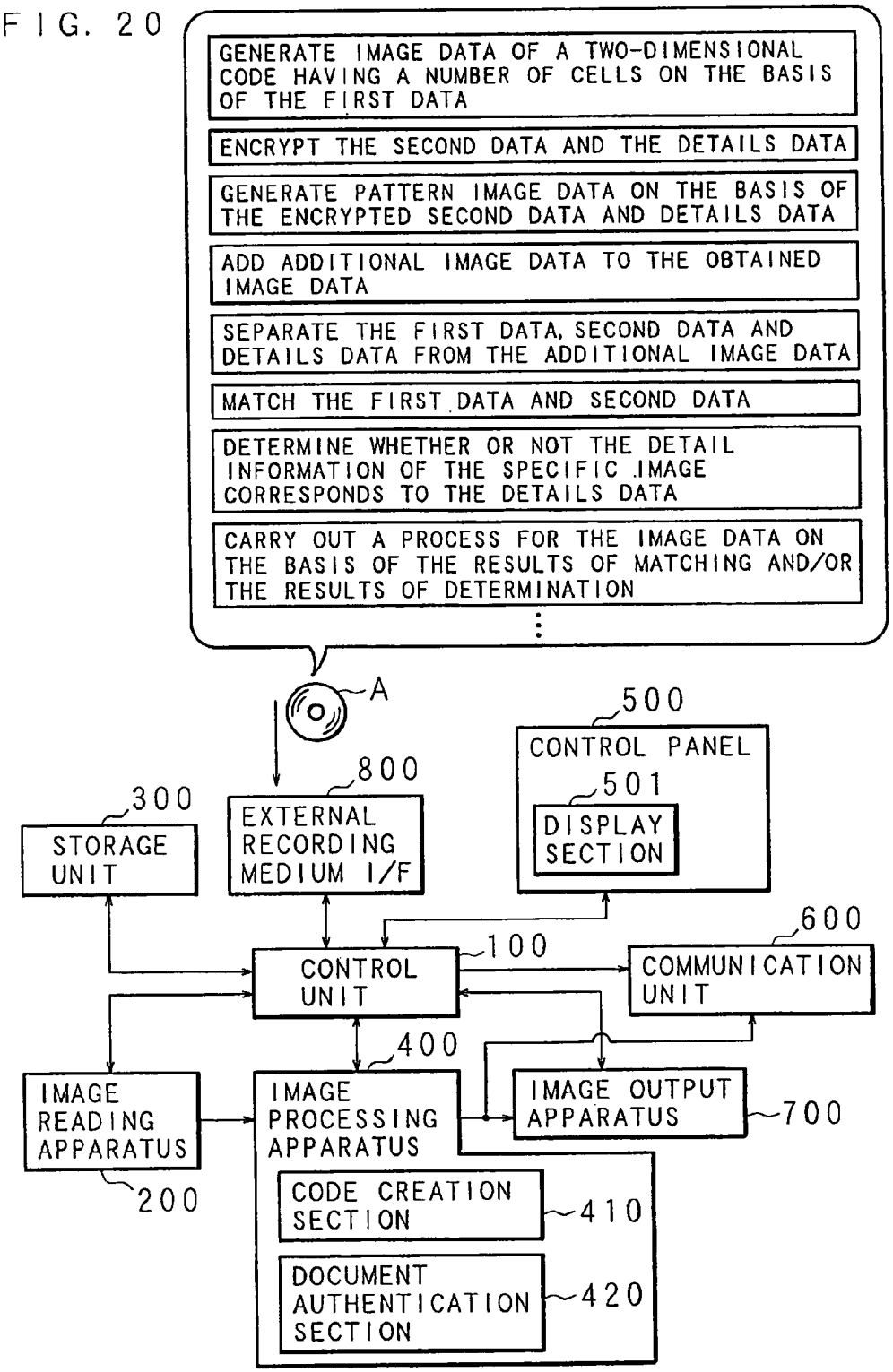
FIG. 20 is a block diagram illustrating a principal configuration of the digital multi-function peripheral 1 of Embodiment 6 of the present invention.
Figure 21B:
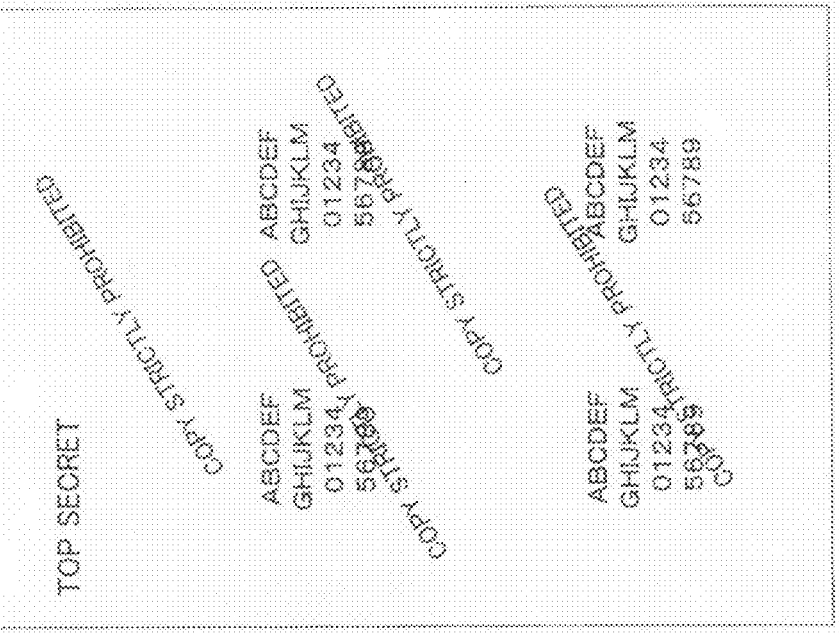
FIG. 21 is a diagram for illustrating a conventional text hiding technology using visible watermark information in a halftone screen.
Figure 21A:
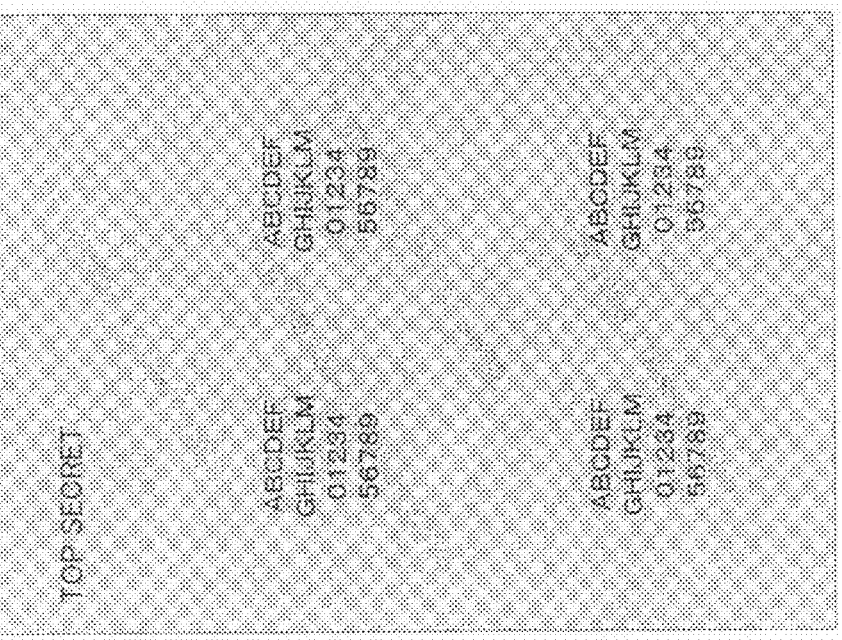

FIG. 20 is a block diagram illustrating a principal configuration of a digital multi-function peripheral 1 according to Embodiment 6. In the digital multi-function peripheral 1 of Embodiment 6, a program for executing processing can be provided in the form of a portable recording medium A such as a CD-ROM (Compact Disc Read-Only Memory) through an external recording medium I/F 800. Furthermore, in the digital multi-function peripheral 1 of Embodiment 6, a computer program can be downloaded from an external device (not shown) through a communication unit 600. This embodiment will now be described in detail.

The digital multi-function peripheral 1 of Embodiment 6 includes an externally (or internally) provided recording medium reading apparatus (not shown). In the digital multi-function peripheral 1 of Embodiment 6, the portable recording medium A storing programs described later and the like is inserted into the recording medium reading unit, so as to install the programs on, for example, a storage unit 300. The programs stored in the portable memory medium A are, for example, a program for allowing the digital multi-function peripheral 1 to receive the first data and second data for the security of the obtained image data, to generate image data of a two-dimensional code having a number of cells on the basis of the first data, to encrypt the second data and the details data representing the detail information of the specific image, to generate pattern image data expressing a gradation pattern in each cell of the two-dimensional code on the basis of the encrypted second data and details data, to add additional image data of the additional image on the basis of the image data and pattern image data of the generated two-dimensional code to the obtained image data, to obtain image data from an image to which an additional image and a specific image are added, to separate the first data, second data and details data from the additional image data of the additional image, to match the first data and second data, to determine whether or not the detail information of the specific image on the basis of the image data corresponds to the details data, to carry out a process for the image data on the basis of the results of matching and/or the results of determination. These programs are executed by loading them on a RAM of a control unit 100. As a result, the digital multi-function peripheral 1 of Embodiment 6 functions as the image forming apparatus of Embodiments 1 through 4.

The recording medium may be a memory (not shown) necessary for executing processing by a microcomputer, such as a program medium like a ROM. Alternatively, the recording medium may be a medium fixedly storing a program code, such as a tape, a magnetic disc, an optical disc, a card or a semiconductor memory. Examples of the tape are a magnetic tape and a cassette tape. Examples of the magnetic disc are a flexible disc and hard disc. Examples of the optical disc are a CD-ROM, an MO (MagnetoOptic disc), an MD (Magnetic Disc) and a DVD (Digital Versatile Disc). Examples of the card are an IC (Integrated Circuit) card (including a memory card) and an optical card. Examples of the semiconductor memory are a mask ROM, an EPROM (Erasable Programmable Read-Only Memory), an EEPROM (Electrically Erasable and Programmable Read-Only Memory), and a flash ROM (Read-Only Memory).

The recording medium may be a medium on which a program code is downloaded through the communication unit 600 from a communication network so as to fluidally store the program code. Incidentally, when a program is downloaded from a communication network, a program for the download should be precedently stored in a main part of the apparatus or should be installed from a recording medium. It is noted that the present invention may be practiced also by a digital multi-function peripheral that receives an electronically sent program code and executes the program in accordance with computer data signals embedded in carriers.

Like reference numerals are used to refer to like elements used in Embodiment 1 or 2 so as to omit the detailed description.

Though the above described embodiments are described using an example of a visible watermark information in a halftone design is added as a specific image, the invention is not limited to this. The specific image may be made up of visible text, instead of visible watermark information of text. The invention is possible as long as such a specific image can be specified as details data for the visible watermark information pattern.

As this description may be embodied in several forms without departing from the spirit of essential characteristics thereof, the present embodiment is therefore illustrative and not restrictive, since the scope is defined by the appended claims rather than by the description preceding them, and all changes that fan within metes and bounds of the claims, or equivalence of such metes and bounds thereof are therefore intended to be embraced by the claims.

What is claimed is:

1. An image processing apparatus for carrying out a process of adding specific image data of a specific image to obtained image data, comprising:
    a receiving section for receiving first data and second data concerning the security of the obtained image data;
    a code generation section for generating image data for a two-dimensional code having a number of cells on the basis of said first data;
    an encryption section for encrypting said second data and details data identifying said specific image;
    a pattern generation section for generating pattern image data showing a gradation pattern in a cell of said two-dimensional code on the basis of the encrypted second data and details data; and
    an addition section for adding additional image data of an additional image based on the generated image data of the two-dimensional code and the pattern image data, and the specific image data to said obtained image data.

2. The image processing apparatus according to claim 1, further comprising:
    a storage section for storing a number of pieces of specific image data; and
    a selection receiving section for selecting and receiving one or more pieces of specific image data to be added to said obtained image data from among said number of pieces of specific image data.

3. The image processing apparatus according to claim 1, wherein said specific image is a visible watermark information in a halftone screen image or a watermark image.

4. An image processing apparatus, comprising:
    an obtaining section for obtaining image data from an image to which additional image data of an additional image and specific image data of a specific image are added by means of the image processing apparatus according to claim 1;
    a separation section for separating the first data, second data and details data from the additional image data of said additional image;
    a matching section for determining whether there is a relationship between the first data and second data separated by said separation section; and
    a process section for carrying out a process for said image data on the basis of the results of a determination by the matching section and/or said details data.

5. The image processing apparatus according to claim 4, further comprising
    a determination section for determining whether or not detail information of the specific image on the basis of the image data obtained by said obtaining section corresponds to the details data separated by said separation section, wherein said process section carries out a process for said image data on the basis of the results of a determination by the determination section.

6. The image processing apparatus according to claim 4, further comprising
    a third data receiving section for receiving third data different from the first data and second data,
        wherein said matching section carries out a determination of whether there is a relationship between said third data and said first data or second data, and
        said process section carries out a process for said image data on the basis of the results of the determination by said matching section.

7. An image reading apparatus, comprising the image processing apparatus according to claim 1, wherein said image processing apparatus adds additional image data and specific image data to image data obtained from a document.

8. An image reading apparatus, comprising:
    the image processing apparatus according to claim 4; and
    a reading section for reading image data from a document, wherein
    in the case where image data to which additional image data and specific image data have been added is obtained from said reading section by the image processing apparatus, the separation section of said image processing apparatus separates the first data, second data and details data from said additional image data so that a process for said obtained image data can be carried out on the basis of the results of a determination by the matching section of said image processing apparatus and/or said details data.

9. An image forming apparatus, comprising the image processing apparatus according to claim 1, wherein an image is formed on a sheet on the basis of the image data to which additional image data and specific image data have been added by the image processing apparatus.

10. An image forming apparatus, comprising the image processing apparatus according to claim 4, wherein in the case where image data to which additional image data and specific image data have been added is obtained, an image on the basis of the obtained image data is formed on a sheet on the basis of the results of a determination by the matching section of said image processing apparatus and/or said details data.

11. An image processing method for carrying out a process of adding specific image data of a specific image to obtained image data, comprising:
   a receiving step of receiving first data and second data for the security of the obtained image data;
   a generating step of generating image data of a two-dimensional code having a number of cells on the basis of said first data;
   an encrypting step of encrypting said second data and details data identifying said specific image;
   a pattern generating step of generating pattern image data showing a gradation pattern in a cell of said two-dimensional code on the basis of the encrypted second data and details data; and
   an adding step of adding additional image data of an additional image based on the generated image data of the two-dimensional code and the pattern image data, and the specific image data to said obtained image data.

12. An image processing method, comprising:
   an obtaining step of obtaining image data from an image to which an additional image and a specific image have been added in accordance with the image processing method according to claim 11;
   a separating step of separating the first data, second data and details data from the additional image data of said additional image;
   a matching step of determining whether there is a relationship between the first data and the second data separated in said separating step;
   a determining step of determining whether or not detail information of the specific image on the basis of the image data obtained in said obtaining step corresponds to the details data separated in said separating step; and
   a processing step of carrying out a process for said image data on the basis of the results of a determination in said matching step and/or the results of a determination in said determining step.

13. A non-transitory recording medium, whereon a computer program for causing a computer to carry out a process of adding specific image data of a specific image to obtained image data is recorded and which can be read by a computer, said computer program comprising:
   a step of causing said computer to receive first data and second data for the security of the obtained image data;
   a step of causing said computer to generate image data of a two-dimensional code having a number of cells on the basis of the first data;
   a step of causing said computer to encrypt the second data and details data identifying said specific image;
   a step of causing said computer to generate pattern image data expressing a gradation pattern in each cell of the two-dimensional code on the basis of the encrypted second data and details data; and
   a step of causing said computer to add additional image data of an additional image based on the generated image data of the two-dimensional code and the pattern image data, and the specific image data to said obtained image data.

14. A non-transitory recording medium whereon a computer program is recorded which can be read by a computer, said computer program comprising:
   an obtaining step of causing said computer to obtain image data from an image to which an additional image and a specific image have been added using a computer program recorded on a recording medium according to claim 13;
   a separation step of causing said computer to separate the first data, second data and details data from the additional image data of the additional image;
   a matching step of causing said computer to determine whether there is a relationship between the first data and second data separated in the separating step;
   a determining step of causing said computer to determine whether or not detail information of the specific image on the basis of the image data obtained in the obtaining step corresponds to the details data separated in the separating step; and
   a step of causing said computer to carry out a process for the image data on the basis of the results of a determination in the matching step and/or the results of a determination in the determining step.

15. The image processing apparatus according to claim 1, wherein the pattern generation section generates a pattern image data representing at least a kind of gradation pattern in each cell of said two-dimensional code on the basis of the encrypted second data and details data.

* * * * *